United States Patent
Yang et al.

(10) Patent No.: US 11,812,492 B2
(45) Date of Patent: Nov. 7, 2023

(54) SYSTEMS AND METHODS FOR MAINTAINING MOBILE BASE STATION SIGNAL AND DATA CONNECTIONS

(71) Applicant: ZTE CORPORATION, Guangdong (CN)

(72) Inventors: Li Yang, Guangdong (CN); Xiaojuan Shi, Guangdong (CN); He Huang, Guangdong (CN); Jianwu Dou, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/211,476

(22) Filed: Mar. 24, 2021

(65) Prior Publication Data
US 2021/0307105 A1 Sep. 30, 2021

Related U.S. Application Data

(63) Continuation of application No. PCT/CN2018/107365, filed on Sep. 25, 2018.

(51) Int. Cl.
*H04W 88/16* (2009.01)
*H04W 76/25* (2018.01)
(Continued)

(52) U.S. Cl.
CPC .......... *H04W 76/25* (2018.02); *H04W 88/16* (2013.01); *H04W 80/12* (2013.01); *H04W 84/06* (2013.01)

(58) Field of Classification Search
CPC ..... H04W 76/25; H04W 88/16; H04W 80/12; H04W 84/06; H04W 36/12; H04W 36/02
See application file for complete search history.

(56) References Cited

U.S. PATENT DOCUMENTS 5,537,679 A * 7/1996 Crosbie ................ H04B 7/1856
455/13.2
10,064,178 B1 8/2018 Bartlett et al.
(Continued)

FOREIGN PATENT DOCUMENTS

CN 101527973 A 9/2009
CN 102892172 A 1/2013
(Continued)

OTHER PUBLICATIONS

Fiorani (U.S. Appl. No. 62/587,723, filed Nov. 2017).*
(Continued)

*Primary Examiner* — Lakeram Jangbahadur
(74) *Attorney, Agent, or Firm* — Duane Morris LLP

(57) ABSTRACT

This disclosure relates generally to wireless communications and, more particularly, to systems and methods for maintaining signal and data connections from a mobile base station portion relative to a fixed network portion. In one embodiment, a method performed by a communication node gateway, includes: receiving a signal from a mobile communication node portion at a first dynamic port during a first duration of time; directing the signal from the first dynamic port to a static port associated with transport network layer information during the first duration of time; receiving the signal at a second dynamic port during a second duration of time after the first duration of time; and directing the signal from the second dynamic port to the static port during the second duration of time by using the transport network layer information.

18 Claims, 17 Drawing Sheets

(51) Int. Cl.
*H04W 80/12* (2009.01)
*H04W 84/06* (2009.01)

(56) References Cited

U.S. PATENT DOCUMENTS

| | | | |
|---|---|---|---|
| 2007/0293186 A1 | 12/2007 | Lehmann | |
| 2010/0234071 A1 | 9/2010 | Shabtay et al. | |
| 2010/0265878 A1* | 10/2010 | Foxworthy | H04W 36/0016 |
| | | | 370/316 |
| 2014/0269610 A1* | 9/2014 | Hiben | H04W 36/14 |
| | | | 370/331 |
| 2019/0149365 A1* | 5/2019 | Chatterjee | H04W 80/02 |
| | | | 370/329 |
| 2021/0345440 A1* | 11/2021 | Fiorani | H04W 76/25 |

FOREIGN PATENT DOCUMENTS

| | | |
|---|---|---|
| CN | 105210358 A | 12/2015 |
| CN | 107251452 A | 10/2017 |
| FR | 2796229 A1 | 1/2001 |
| WO | 2014034255 A1 | 3/2014 |

OTHER PUBLICATIONS

SA WG2, "Presentation of TR: TR 23.791, Version 1.0.0: "Study of Enablers for Network Automation for 5G" for Information", SA WG2 Meeting #128b, S2-188667, Sophia-Antipolis, France, Sep. 14, 2018 (Sep. 14, 2018), 2 pages.

Satellite Earth Stations and Systems (SES); Seamless integration of satellite and/or HAPS (High Altitude Platform Station) systems into 5G system, "Integration scenarios of satellite and HAPS in 5G and related architecture options"ETSI Draft Specification; 103 611, European Telecommunications Standards Institute (ETSI), 650, Route Des Lucioles ; F-06921 Sophia-Antipolis ; France vol. WG SES SCN Satellite Communications and Navigation, No. V0.0.2 May 28, 2018 (May 28, 2018), pp. 1-82.

Ericsson: "Considerations on Mobility in Non-Terrestrial Networks", 3GPP TSG RAN WG3 #101; R3-184979, Gothenburg, Sweden; Aug. 20, 2018-Aug. 24, 2018, Aug. 10, 2018, 4 pages.

* cited by examiner

SYSTEMS AND METHODS FOR MAINTAINING MOBILE BASE STATION SIGNAL AND DATA CONNECTIONS

TECHNICAL FIELD

This disclosure relates generally to wireless communications and, more particularly, to systems and methods for maintaining signal and data connections from a mobile base station portion relative to a fixed network portion.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Fourth-generation (4G) terrestrial (e.g., land) based mobile communication systems or Long Term Evolution (LTE) mobile communication systems typically include, among other components, a 4G core network evolved packet core (EPC) and a radio access network (RAN). The 4G EPC may include basic network element nodes such as a mobility management entity (MME), a serving gateway (SGW), a packet gateway (PGW), and a public data network (PDN) gateway or node.

Also, a 5th generation (5G) terrestrial-based cellular mobile communication system may include a next generation core network (5GC) and a next generation radio access network (NG-RAN). The 5GC may include an access mobility function (AMF), a session management function (SMF), and a user plane function (UPF). A base station (BS) may be configured to operate with, for example, two different radio access technology (RAT) types. For example, a BS may have respective BS network element interfaces for the different RATs. The BS may be referred to as an gNB or also be referred to as an next generation evolved Node B (ng-eNB). The BS may be connected to the 5GC through a standardized NG interface (e.g., an NG interface control plane (signaling) connection or an NG interface user plane (user data) connection). Also, various BSes may be connected to each other through an Xn interface (e.g., an Xn-C control plane interface and an Xn-U user plane interface). The NG interface, Xn interface, and F1 interface (discussed below) may be examples of application layer interface connection instances.

FIG. 1A is a diagram 100 of an aggregated BS 102. The BS 102 may also be referred to as an aggregated next generation radio access network (NG-RAN) node. The BS 102 may communicate with a core network 104 (e.g., 5GC or a 5G core network) over an NG interface. The BS 102 may also include two BS portions 108A, 108B. Each of the BS portions 108A, 108B may communicate with each other over an Xn interface.

FIG. 1B is a diagram 120 of a disaggregated BS 122. The BS 122 may also be referred to as a disaggregated NG-RAN node. The BS 122 may be implemented with multiple BS parts 124, 126 as respective next generation nodeBs (gNB). BS part 124 may have a respective central unit (gNB-CU) 124A, 126A connected with two respective distributed units (gNB-DUs) 124B, 126B. The respective gNB-CU 124A, 124B may communicate with their respective gNB-DUs 124B, 126B via an F1 interface. Also, each BS part 124, 126 may communicate with each other over an Xn interface.

Furthermore, each BS part 124, 126 may communicate with a 5GC 130 over a respective NG interface. The F1 interface may include an F1-C control plane interface and a F1-U user plane interface. The control plane connection of the above various types of interfaces may be used for transmitting control signaling messages between BSes (e.g., network element nodes), and user plane connections may be used for transmitting user service data (e.g., packets).

FIG. 1C is an interface protocol stack 140 of a control plane. The interface protocol stack may include a radio network layer 142 above a transport network layer 144. The radio network layer 142 may include various interfaces, such as the NG, Xn, and F1 interfaces. For example, the radio network layer 142 may include application protocol aspects of the interfaces, such as an NG interface with application protocol aspects (NGAP), an Xn interface with application protocol aspects (XnAP), and an F1 interface with application protocol aspects (F1AP). Each of the interfaces may also be termed as logical network application layer protocols. The radio network layer 142 may sit on transport network layer (TNL) 144 protocols, such as the streaming control transport protocol (SCTP), internet protocol (IP), data link layer protocol and/or physical layer protocol to transfer control signaling.

FIG. 1D is a user plane protocol stack 160. The user plane protocol stack 160 may include user data frames 162 for the NG, Xn, and F1 interfaces. These user data frames 162 may be at a higher level of abstraction over a general packet radio service (GPRS) tunneling protocol (GTP-U) 164. The GTP-U 164 may be at a higher level of abstraction over a user datagram protocol (UDP) 166. The UDP 166 may be at a higher level of abstraction over an internet protocol (IP) 168 such as IP version 6 (IPv6) or IP version 4 (IPv4). The IP 168 may be at a higher level of abstraction over a data link layer 170. Lastly, the data link layer 170 may be at a higher level of abstraction over a physical layer 172.

In a traditional terrestrial-based cellular mobile network, the deployment of various BSes are relatively static and fixed. Therefore, the general locations of the interfaces for these BSes are also fixed relative to the fixed physical locations of the BSes. Accordingly, interfaces such as NG, Xn and F1 may be implemented by fixed-line methods such as broadband fiber, for transmission robustness and reduced delay. This type of fixed terrestrial-based cellular mobile network is convenient for deployment and resource management as all network elements (e.g., nodes and/or BSes) may be planned and managed in a generally static manner. Accordingly, issues of mobility such as continuity of service tends to only come up due to user equipment (UE) mobility and not due to BS mobility.

For simplicity of explanation, the radio network layer (RNL) interfaces, such as the NG, Xn, and F1 interfaces, along with the transport network layer TNL protocols, such as the Streaming Control Transport Protocol (SCTP), and the general packet radio service (GPRS) tunneling protocol (GTP-U) may be collectively referred to as a transport channel or transport channels. FIG. 1E is a schematic diagram 180 of transport channels with mobile base stations 182A, 182B, 182N that interface with a 5GC 184. The value "N" may be associated with an arbitrary quantity. Each of the mobile base stations 182A, 182B, 182N may have respective BS transport ports 186A, 186B, 186N. For ease of explanation, the term "transport port" may be used in a generic sense to refer to, for example, a terminating point of a TNL connection. Also, the 5GC 184 may have respective 5GC transport ports 188A, 188B, 188C, 188N. Each of the BS transport ports 186A, 186B, 186N and the 5GC transport ports 188A, 188B, 188C, 188N may be associated with particular TNL information, such as a transport port address (e.g., a transport layer address, remote IP address, GTP-U tunnel address, and the like) or a collection of transport port addresses. For ease of explanation, the term "transport port address" may be used in a generic sense, without specific reference to a specific definition in a particular standard.

The signaling and data interaction between the mobile base stations 182A, 182B, 182N and the core network 5GC 184 may be based on the TNL layer transport channel. The establishment of each transport channel may depend on the configuration of the mobile base stations 182A, 182B, 182N and the 5GC 184. For example, the 5GC 184 may provide the TNL information (e.g., at least one transmission port address) associated with 5GC transport port 188A to the mobile base station 182A. The mobile base station 182A may initiate association and communication with the 5GC 184 using the TNL information associated with 5GC transport port 188A. The mobile base station 182A may then send uplink signals and data to the 5GC 184 using the TNL information associated with 5GC transport port 188A once a connection instance between the mobile base station 182A and the 5GC 184 is established.

Similarly, the mobile base station 182A may provide TNL information (e.g., at least one transmission port address) associated with BS transport port 186A to the 5GC 184. The 5GC 184 may initiate association and communication with the mobile base station 182A using the TNL information associated with the BS transport port 186A. Then, the 5GC 184 may send downlink signals and data to the mobile base station 182A using the TNL information associated with BS transport port 186A once a connection instance between the mobile base station 182A and the 5GC 184 is established.

When the transport channel between the mobile base station 182B and the 5GC 184 fails (e.g., due to an interruption or congestion) at 5GC transport port 188A, the mobile base station 182B may perform a re-association attempt with 5GC transport port 188B (e.g., a different 5GC transport port). This re-association attempt may be based on the TNL information (e.g., at least one transmission port address) associated with the 5GC transport port 188B. The TNL information associated with the 5GC transport port 188B may be provided to the mobile base station 182B via a 5GC allocation (e.g., prior signaling or information exchange with the 5GC). Accordingly, the mobile base station 182B may send uplink signals and data to the 5GC 184 via 5GC transport port 188B once a new connection instance between the mobile base station 182B and the 5GC 184 is re-established. The subsequent successful establishment of a new transport channel may enable signaling and data transmissions between the mobile base station 182B and the 5GC 184 at the radio network layer (RNL).

Similarly, when the transport channel between an arbitrary mobile base station 182N and the 5GC fails, the arbitrary mobile base station 182N may also perform a re-association attempt based on any of the non-failed TNL information (e.g., a single one or a set of transport port addresses not associated with a failed communication) Also, the 5GC may notify other mobile base stations of a failed communication, or of a transport port address or other TNL information associated with a failed communication.

Accordingly, the 5GC 184 and the various mobile base stations 182A, 182B, 182N may maintain communications (e.g., maintain communications with a set level of smoothness, robustness, and lack of delay) via a transport channel by managing the use of TNL information (e.g., at least one transmission port address) through associations and re-associations. The lack of such management would lead to a loss of communications and a drop in a user's service experience. Such management of the TNL information may also be applicable to TNL information associated with interfaces such as the Xn interface and the F1 interface. In certain embodiments, TNL information may be utilized to synchronize and facilitate communications with particular ports, such as by using the TNL information to uniquely identify a desired port for communications.

The air interface (e.g., air interface service cellular coverage or capacity) of mobile base stations (e.g., vehicle mounted mobile base stations, aerial drone base stations, space satellite communication base stations, and the like) may be variable due to the mobile base stations being capable of movement to and away from a 5GC. Accordingly, the RNL interfaces such as the NG interface, Xn interface, and F1 interface may also have variable TNL related aspects that cannot be fixed (e.g., cannot be solely connected by a rigid broadband fiber). These interfaces may be implemented by flexible connections such as microwave, laser, relay interfaces and the like. However, even though these interfaces may be implemented by flexible connections, these interfaces may still be subject to failures or interruptions as the mobile base stations move away from the ports that they communicate with. These failures and/or interruptions may reduce the quality of communications for a UE.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication node gateway, includes: receiving a signal from a mobile communication node portion at a first dynamic port during a first duration of time; directing the signal from the first dynamic port to a static port associated with transport network layer information during the first duration of time; receiving the signal at a second dynamic port during a second duration of time after the first duration of time; and directing the signal from the second dynamic port to the static port during the second duration of time by using the transport network layer information.

In a further embodiment, a non-transitory computer readable medium has instructions stored thereon. The instructions, in response to execution by a processor, cause a device to perform operations comprising: receiving a signal from a mobile communication node portion at a first dynamic port during a first duration of time; directing the signal from the first dynamic port to a static port associated with transport network layer information during the first duration of time; receiving the signal at a second dynamic port during a second duration of time after the first duration of time; and directing the signal from the second dynamic port to the static port during the second duration of time by using the transport network layer information.

In a further embodiment, a communication node gateway, includes: a transceiver configured to: receive a signal from a mobile communication node portion at a first dynamic port during a first duration of time; and receive the signal at a second dynamic port during a second duration of time after the first duration of time at least one processor configured to: direct the signal from the first dynamic port to a static port associated with transport network layer information during the first duration of time, and direct the signal from the second dynamic port to the static port during the second duration of time by using the transport network layer information.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

As described below, the discussion below may refer to functional entities, such as a BS, UE, core network, cell, etc. (either in physical or virtual form), which are similar to those mentioned above with respect to conventional communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Figure 1A:
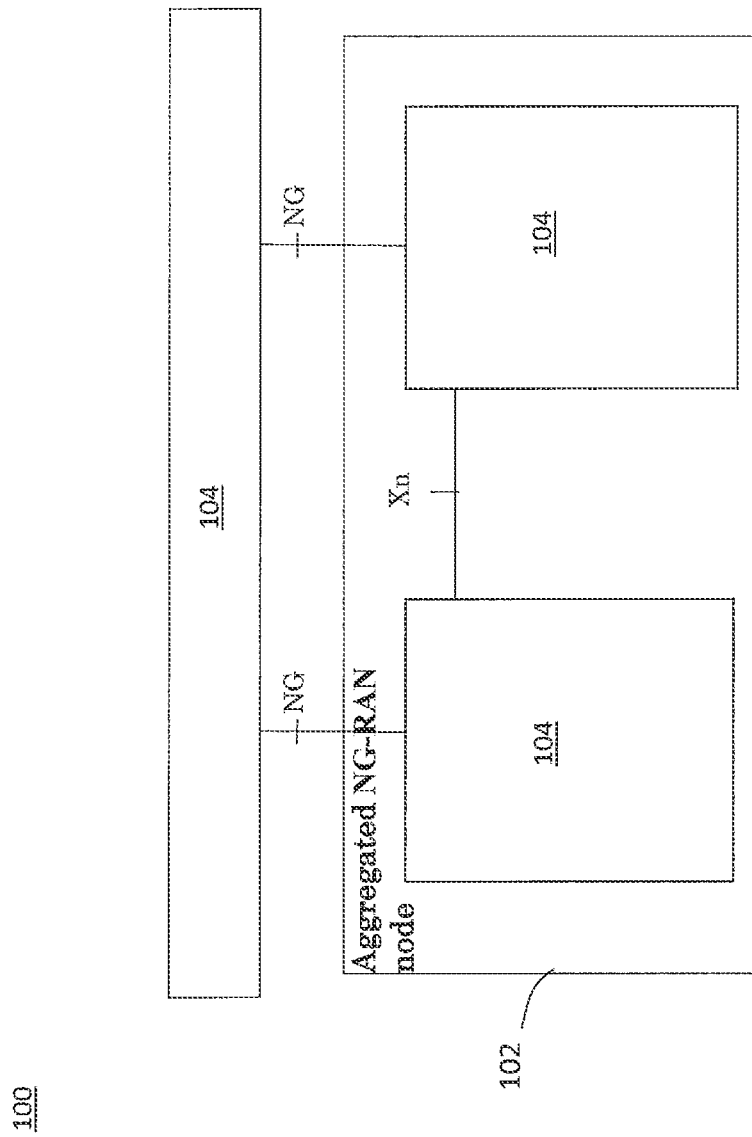
FIG. 1A is a diagram of an aggregated BS.
Figure 1B:
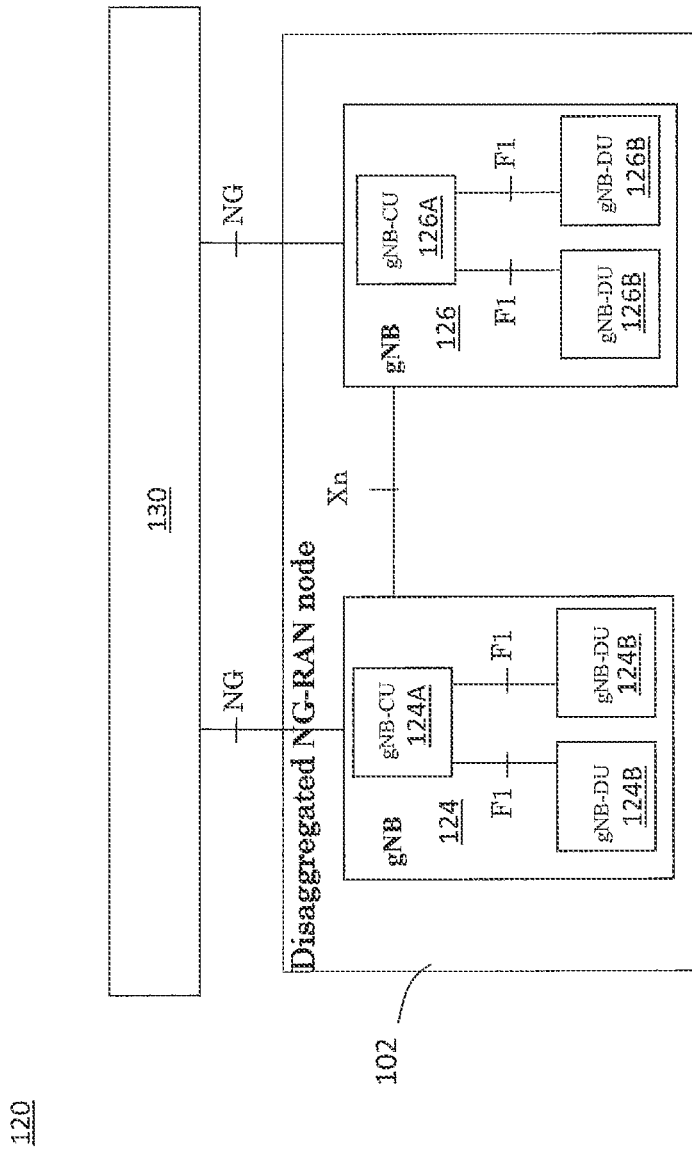
FIG. 1B is a diagram of a disaggregated BS.
Figure 1C:
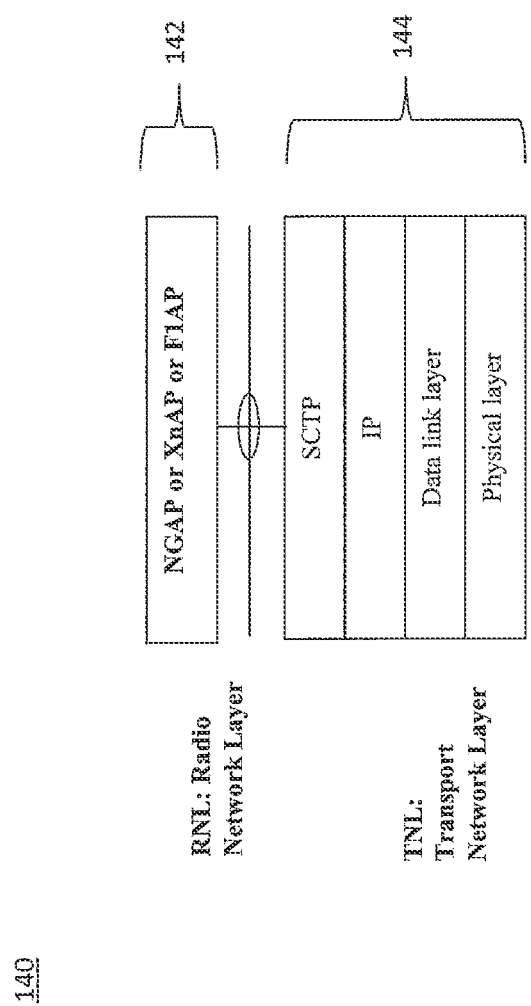
FIG. 1C is an interface protocol stack of a control plane.
Figure 1D:
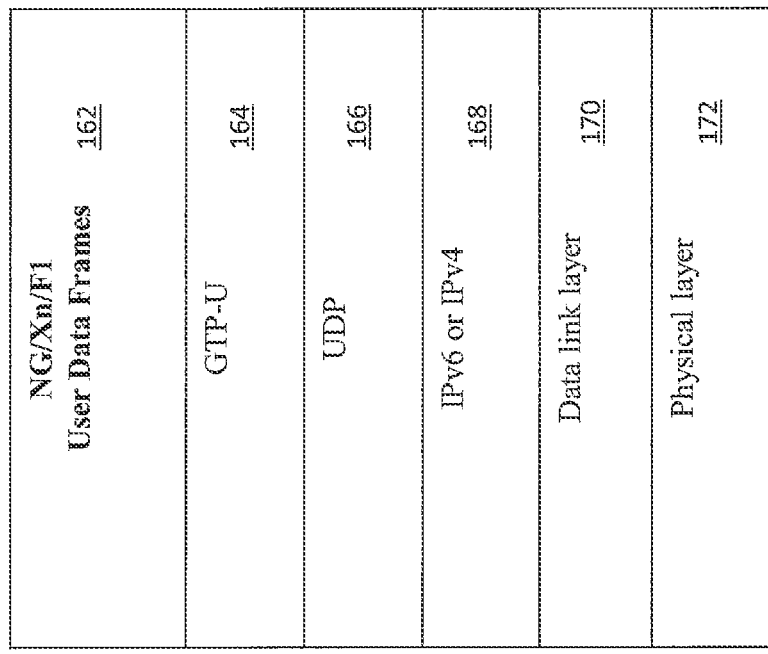
FIG. 1D is a user plane protocol stack.
Figure 1E:
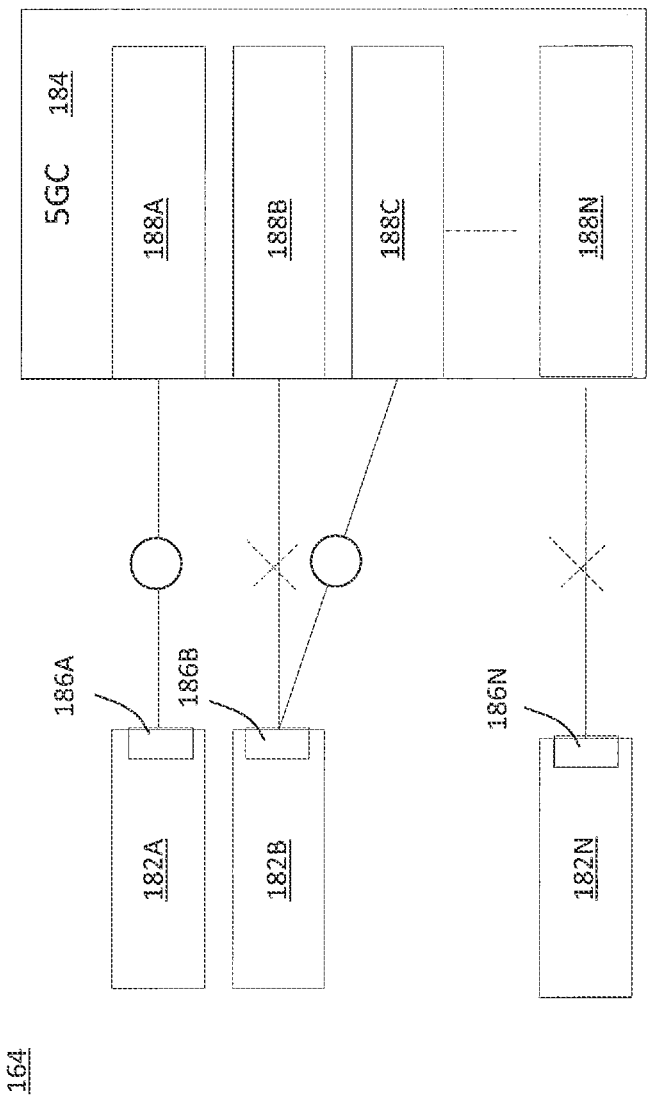
FIG. 1E is a schematic diagram of transport channels with mobile base stations that interface with a core network.
Figure 2:
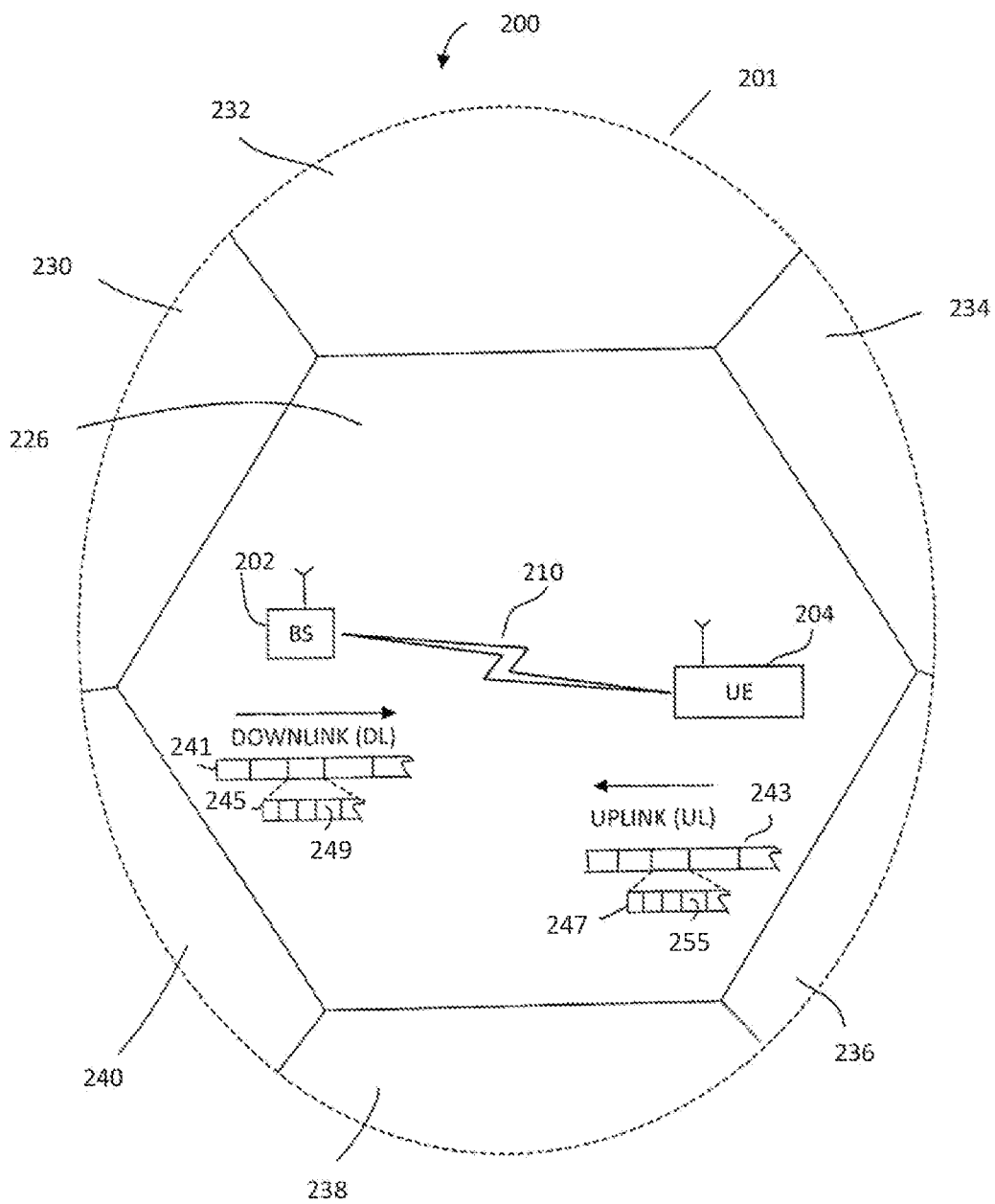
FIG. 2 illustrates an exemplary wireless communication network in which techniques disclosed herein may be implemented, in accordance with an embodiment of the present disclosure.

FIG. 2 illustrates an exemplary wireless communication network 200 in which techniques disclosed herein may be implemented, in accordance with an embodiment of the present disclosure. The exemplary communication network 200 may overlay a geographic area 201 and include a base station (BS) 202 and a user equipment (UE) device 204 (e.g., UE 204) that can communicate with each other via a communication link 210 (e.g., a wireless communication channel), and a cluster of notional cells 226, 230, 232, 234, 236, 238 and 240. In FIG. 2, the BS 202 and UE 204 are contained within the geographic boundary of cell 226. Each of the other cells 230, 232, 234, 236, 238 and 240 may include at least one base station (BS) operating at its allocated bandwidth to provide adequate radio coverage to its intended users. For example, the BS 202 may operate at an allocated channel transmission bandwidth to provide adequate coverage to the UE 204. The BS 202 and the UE 204 may communicate via a downlink radio frame 241 for BS/UE communications, and an uplink radio frame 243 for BS/UE communications respectively. Each radio frame 245/247 may be further divided into sub-frames 249/251 which may include data symbols 253/255. Accordingly, reference to a cell may also be a short hand reference to a BS with an associated coverage region or area.

In the present disclosure, the base station (BS) 202 and user equipment (UE) 204 are described herein as non-limiting examples of "communication nodes," generally, which can practice the methods disclosed herein. Such communication nodes may be capable of wireless and/or wired communications, in accordance with various embodiments of the invention. Each of these communication nodes may be a transmitter in one situation and a receiver in another situation. For example, a BS 202 may transmit to a UE 204, such as during a downlink (DL), discussed further below. Therefore, the BS 202 may be a transmitter and the UE 204 may be a receiver. However, in another situation (such as during an uplink (UL), described further below) the UE 204 may be a transmitter and the BS 202 may be a receiver. Accordingly, both the BS 202 and the UE 204 may be a receiver or a transmitter. In certain embodiments, a communication device may refer to a UE while a communication node may refer to a BS. Furthermore, the term "downlink (DL)" and "uplink (UL)" may be relative terms that describe a relative direction of information flow relative to a BS and/or UE's orientation relative to a core network. For example, a BS may send information via an uplink (UL) signal to a core network and receive information via a downlink (DL) signal from the core network.

As noted above, the BS 202 may communicate with a core network, such as a next generation core network (5GC). The core network may include functions (e.g., modules) such as an access mobility function (AMF), a session management function (SMF), a user plane function (UPF), and the like. Also, in certain embodiments, the BS 202 may be mobile and not fixed in a specific geographical location. For example, the BS 202 in whole or part may be a mobile BS that can be moved from place to place as part of a vehicle, satellite, drone (e.g., unmanned aerial vehicle), satellite, and the like. Accordingly, the geographic boundary of the notional cells 226, 230, 232, 234, 236, 238 and 240 associated with a mobile BS may also be mobile and may move with the mobile BS.

Figure 3:
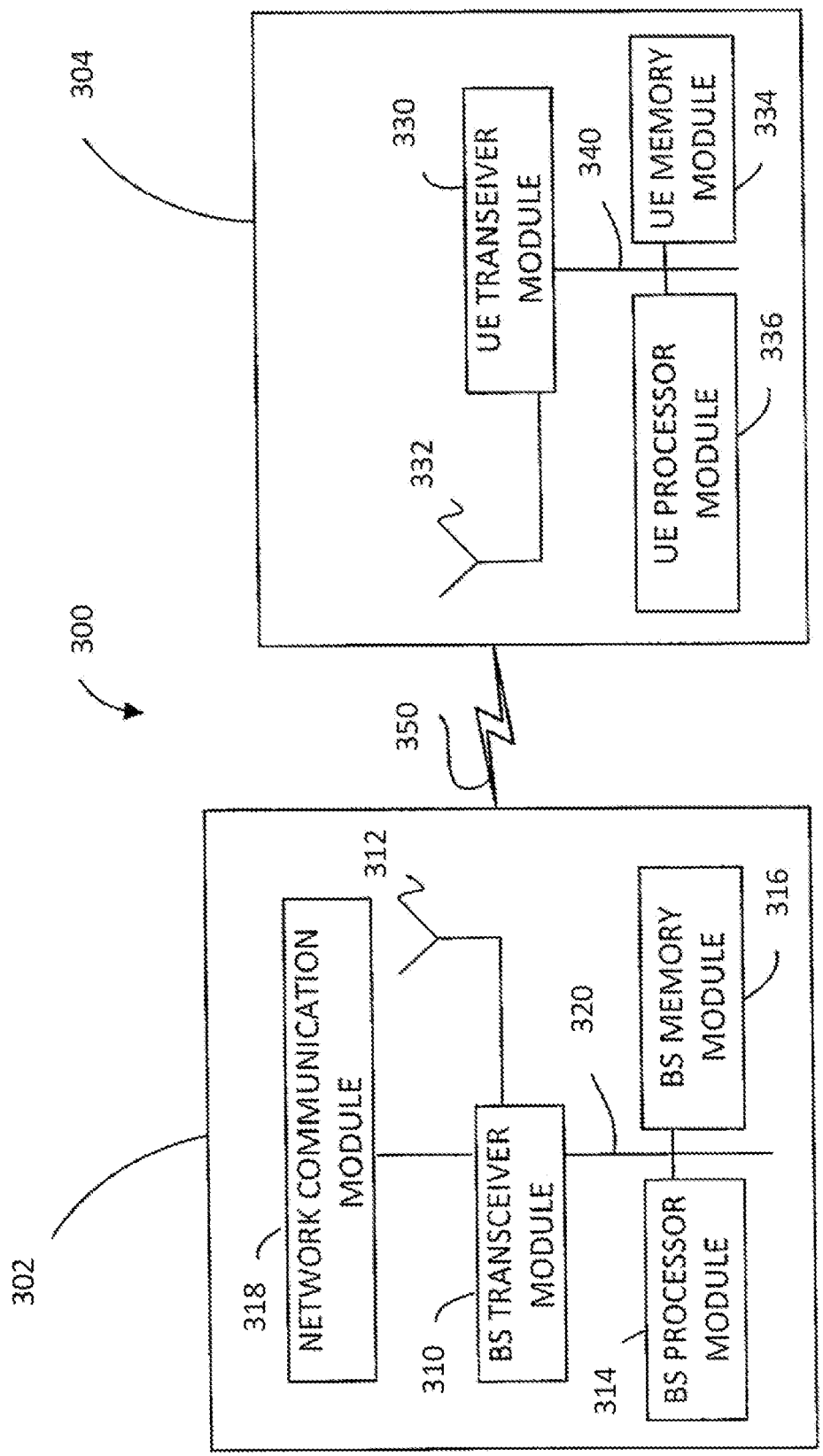
FIG. 3 illustrates block diagrams of an exemplary system including a base station (BS) and user equipment (UE), in accordance with some embodiments.

FIG. 3 illustrates block diagrams of an exemplary system 300 including a base station (BS) 302 and user equipment (UE) 304 for transmitting and receiving wireless communication signals, e.g., OFDM/OFDMA signals, between each other. The system 300 may include components and elements configured to support known or conventional operating features that need not be described in detail herein. In one exemplary embodiment, system 300 can be used to transmit and receive data symbols in a wireless communication environment such as the wireless communication environment 200 of FIG. 2, as described above.

The BS 302 includes a BS transceiver module 310, a BS antenna 312, a BS processor module 314, a BS memory module 316, and a network communication module 318, each module being coupled and interconnected with one another as necessary via a data communication bus 320. In certain embodiments, the data communications bus 320 may be implemented as a wireless bus from which modules or other portions of the BS 302 may communicate with each other wirelessly.

The UE 304 includes a UE transceiver module 330, a UE antenna 332, a UE memory module 334, and a UE processor module 336, each module being coupled and interconnected with one another via a data communication bus 340. The BS 302 communicates with the UE 304 via a communication channel (e.g., link) 350, which can be any wireless channel or other medium known in the art suitable for transmission of data as described herein.

As would be understood by persons of ordinary skill in the art, system 300 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 330 may include a RF transmitter and receiver circuitry that are each coupled to the antenna 332. A duplex switch (not shown) may alternatively couple a transmitter or receiver to the uplink antenna in time duplex fashion. Similarly, in accordance with some embodiments, the BS transceiver 310 may include RF transmitter and receiver circuitry that are each coupled to the antenna 312. A duplex switch may alternatively couple a transmitter or receiver to the antenna 312 in time duplex fashion. The operations of the two transceivers 310 and 330 are coordinated in time such that the receiver is coupled to the antenna 332 for reception of transmissions over the wireless transmission link 350 at the same time that the transmitter is coupled to the antenna 312. Preferably there is close time synchronization with only a minimal guard time between changes in duplex direction.

The UE transceiver 330 and the base station transceiver 310 are configured to communicate via the wireless data communication link 350, and cooperate with a suitably configured RF antenna arrangement 312/332 that can support a particular wireless communication protocol and modulation scheme. In some exemplary embodiments, the UE transceiver 308 and the base station transceiver 310 are configured to support industry standards such as the Long Term Evolution (LTE) and emerging 5G and New Radio (NR) standards, and the like. It is understood, however, that the invention is not necessarily limited in application to a particular standard and associated protocols. Rather, the UE transceiver 330 and the base station transceiver 310 may be configured to support alternate, or additional, wireless data communication protocols, including future standards or variations thereof.

In certain embodiments, the antenna 312 may represent one or more antennas configured to communicate with a core network. This communication with a core network may take place with a same physical antenna 312 that is utilized for communication with the UE 304 or may take place with a different physical antenna than that utilized for communication with the UE 304.

In accordance with various embodiments, the BS 302 may be a next generation nodeB (gNodeB or gNB), serving gNB, target gNB, transmission reception point (TRP), evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 314 and 336, respectively, such that the processors modules 314 and 336 can read information from, and write information to, memory modules 316 and 334, respectively. The memory modules 316 and 334 may also be integrated into their respective processor modules 314 and 336. In some embodiments, the memory modules 316 and 334 may each include a cache memory for storing temporary variables or other intermediate information during execution of instructions to be executed by processor modules 314 and 336, respectively. Memory modules 316 and 334 may also each include non-volatile memory or non-transitory memory for storing instructions (e.g., computer readable instructions) to be executed by the processor modules 314 and 336, respectively.

The network communication module 318 generally represents the hardware, software, firmware, processing logic, and/or other components of the BS 302 that enable bi-directional communication between base station transceiver 310 and other network components and communication nodes configured to communication with the BS 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)).

Figure 4:
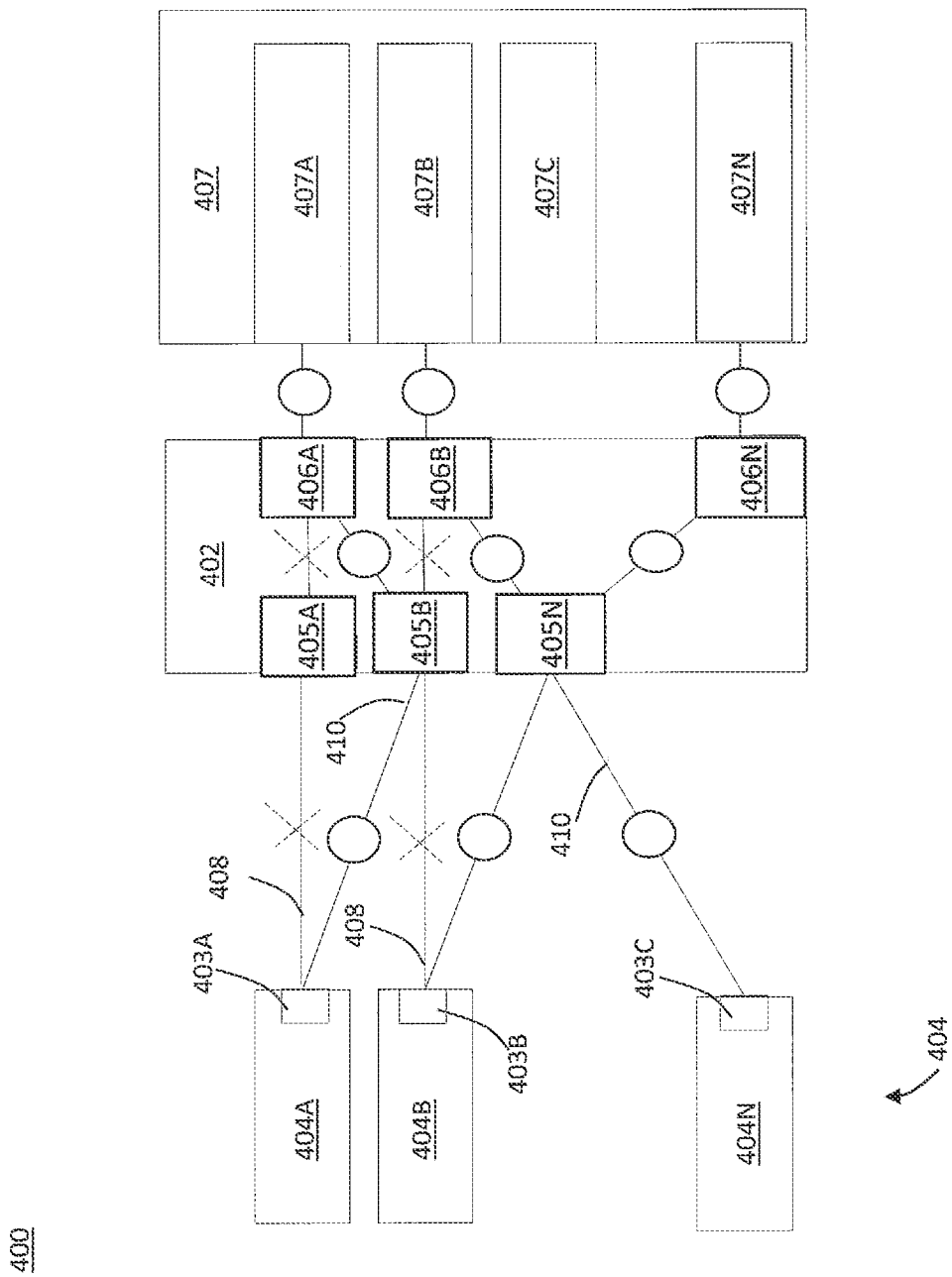
FIG. 4 is a block diagram that illustrates a transport conversion gateway, in accordance with some embodiments.

FIG. 4 is a block diagram 400 that illustrates a transport conversion gateway 402, in accordance with some embodiments. The transport conversion gateway 402 may serve as an intermediary between various mobile BS portions 404, with respective mobile ports 403A, 403B, 403C, and a fixed network portion 407 with fixed ports 407A, 407B, 407C, 407N, each associated with specific transport port information (e.g., a transport port address or a set of transport port addresses).

With respect to communications at the TNL, the transport conversion gateway 402 may be relatively stable, fixed, and consistent compared to the mobile BS portion s 404 which may move about. The fixed network portion 407 may be part of, for example, a base station or a core network fixed relative to the ground to be immobile during operation. In certain embodiments, the fixed network portion may be a centralized unit (gNB-CU) BS while the mobile BS portions 404 may include a distributed unit (gNB-DU) BS. The gNB-CU may also be referred to as CU and the gNB-DU may be referred to as a DU for brevity. Each of the mobile BS portions 404 may be part of a distributed unit (DU) BS and/or radio unit (RU) BSes that may be physically moved. Accordingly, the TNL interfaces associated with the mobile BS portions 404 may be subject to change or disruption. In other embodiments, the fixed network portion may part of a core network.

Also, connections or interfaces between different ports may have an O through them or an X through them. An X through an interface may indicate that the interface is a previous interface 408 that was previously used between ports. An O through an interface may indicate that the interface is a current interface 410 that is currently being used between ports. In certain embodiments, end-to-end communications between the mobile BS portions 404 and a fixed network portion 407 may be maintained by transitioning from a previous interface 408 to a current interface 410.

The transport conversion gateway 402 may dynamically allocate and provide transport port information (e.g., one or more transport port addresses) for each mobile BS portion 404 at the TNL transport channel. This allocation may occur at dynamic allocation ports 405A, 405B, 405N. As noted above, the transport port information (e.g., one or more transport port addresses) may be utilized to direct communications to particular ports in communications between the mobile BS portions 404 and the fixed network portion 407.

Also, the transport conversion gateway 402 may statically allocate and manage transport port information (e.g., one or more transport port addresses) for each fixed port 407A, 407B, 407N of the fixed network portion 407 at the TNL transport channel. This allocation may occur at static allocation ports 406A, 406B, 406N. As noted above, the transport port information (e.g., one or more transport port addresses) may be utilized to direct communications to particular ports in communications between the mobile BS portions 404 and the fixed network portion 407.

Dynamic allocation at the dynamic allocation ports 405A, 405B, 405N may be performed in response to having the mobile BS portions 404 in motion. For example, the communication links or interfaces between the mobile BS portions and the transport conversion gateway 402 may fail or deteriorate as the mobile BS portions are in motion (e.g., as the mobile BS portion move closer or farther from the transport conversion gateway 402). As a result of this motion, the mobile BS portions 404 may transition from one dynamic allocation port to another dynamic allocation port that may be closer, or that may otherwise offer better reception relative to the mobile BS portions. These transitions and/or allocations may be predetermined. For example, the timing of a transition may be set based on a set path of motion for a mobile BS portion. Accordingly, communications between a particular mobile BS portion 404 and the fixed network portion 404 may be maintained as the mobile BS portion moves by transitioning across different dynamic allocation ports.

Similarly, static allocation at the static allocation ports 406A, 406B, 406N may be performed by maintaining an interface between the static allocation ports 406A, 406B, 406N and the respective fixed ports 407A, 407B, 407N as the mobile BS portion 404 is in motion. Stated another way, the transport conversion gateway 402 may maintain transport port information (e.g., one or more transport port addresses) used for the static allocation ports 406A, 406B, 406N and the fixed ports 407A, 407B, 407N while using different transport port information (e.g., one or more transport port addresses) for the dynamic allocation ports 405A, 405B, 405N. Accordingly, of the static allocation ports 406A, 406B, 406N may maintain an interface with a respective one of the fixed ports 407A, 407B, 407N while the mobile BS portion 404 is in motion.

The transport conversion gateway 402 may provide internal routing or direction of signals and/or data in order to reconcile the dynamic nature of the dynamic allocation ports 405A, 405B, 405N and the static nature of the static allocation ports 406A, 406B, 406N. This internal routing may reroute signals and/or data as dynamic allocation ports 405A, 405B, 405N transition amongst each other. Stated another way, end-to-end signal and data communications across the TNL transport channel may be maintained via this internal routing.

In certain embodiments, the transport conversion gateway 402 may predetermine or pre-assign transport port information for different dynamic allocation ports 405A, 405B, 405N and/or static allocation ports 406A, 406B, 406N. Also, signals and/or data that passes through various ports may be multiplexed. For example, signals and/or data that passes through the dynamic allocation port 405N may be multiplexed to share the dynamic allocation port 405N. The signals and/or data that pass through the dynamic allocation port 405N may be respectively received from different mobile BS portions 404B, 404N and redirected (e.g., relayed) within the transport conversion gateway 402 from the same dynamic allocation port 405N to different static allocation ports 406B and 406N.

In particular embodiments, a transport conversion gateway 402 may be implemented internally as part of a BS and/or a core network. Also, in various embodiments, different parts of the transport conversion gateway 402 may be implemented in separate physical parts or physical devices. For example, the dynamic allocation port 405A may be implemented in a different physical device than the static allocation port 406A. However, regardless of whether they are in the same or different physical devices, the dynamic allocation ports 405A, 405B, 405N as well as the static allocation ports 406A, 406B, 406N may be mapped and matched with each other in order to form a transport channel that may direct and redirect (e.g., relay) signal and/or data traffic within the transport conversion gateway 402.

In various embodiments, in two way communications using the TNL transport channel, the transport conversion gateway 402 may allocate different transport port information (e.g., one or more transport port addresses) for association with receipt and transfer of information at a particular dynamic allocation port 405A, 405B, 405N or static allocation port 406A, 406B, 406C. For example, the transport conversion gateway 402 may allocate first transport port information for receipt of a signal and/or data at the dynamic allocation port 405B from mobile BS portion 404A. This first transport port information may be communicated to the mobile BS portion 404A from the transport conversion gateway 402. Also, the transport conversion gateway 402 may allocate second transport port information for receipt of a signal and/or data at the dynamic allocation port 405B from the static allocation port 406B. Accordingly, the signals and/or data received from different sources may utilize transport port information to pass through a same transport port.

Figure 5:
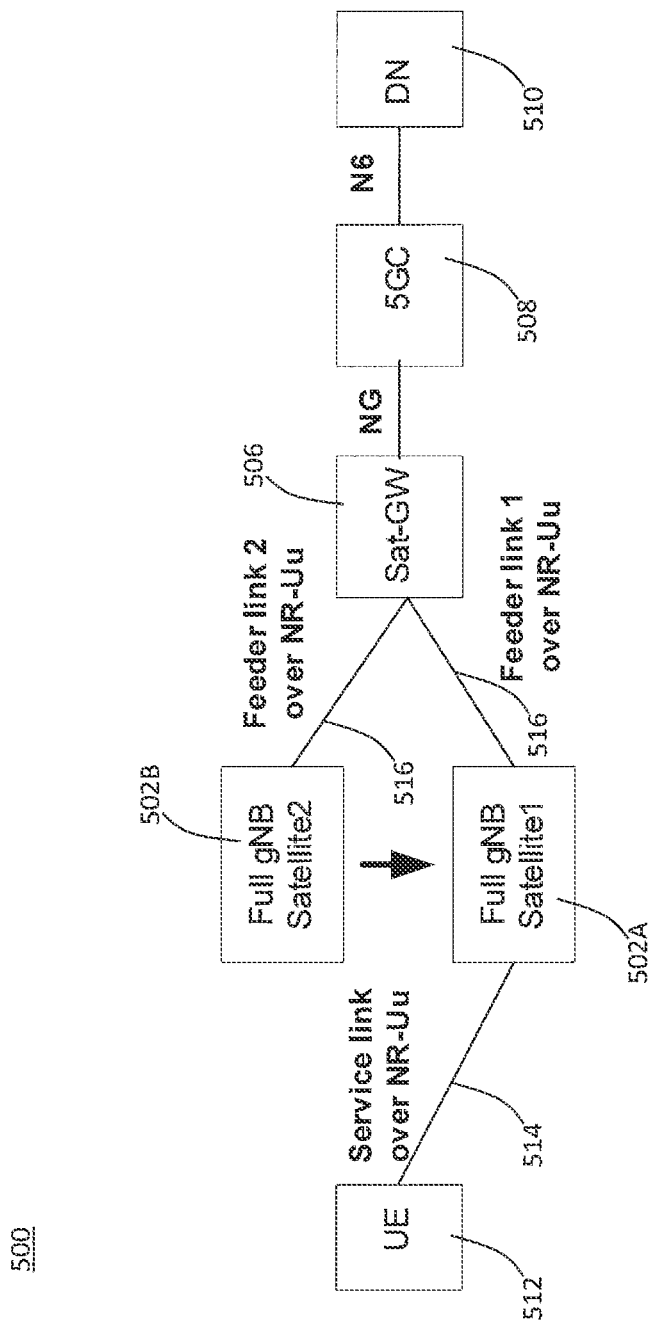
FIG. 5 is a block diagram of mobile base station portions, implemented as a full unit (FU) base station, in accordance with some embodiments.

Advantageously, a (quasi) fixed stationary transport conversion gateway 402 may maintain a robust and smooth TNL transport channel in end-to-end communications between a mobile BS portion and a fixed network portion. More specifically, maintenance in this manner may have the RNL connection instance contexts in both a mobile BS portion and a fixed network portion kept unchanged unless reconfigured in RNL. This may be accomplished by not changing certain application layer interface connection instances such as the NG interface (also referred to as an NGAP interface), Xn interface (also referred to as an XnAP interface), and F1 interface (also referred to as an F1AP interface) while dynamically transitioning from different dynamic allocation ports to maintain an end-to-end signal and/or data connection instance between the mobile BS portion and the fixed network portion. For example, reconstructing or reestablishing a signal and/or data connection across an application layer interface such as the NG interface, Xn interface, and F1 interface may require more resources (e.g., processing power and/or information transfer among devices) than reconstructing or reestablishing a signal and/or data connection across other types of interfaces, such as the interfaces between a mobile BS portion and a dynamic allocation port. Accordingly, the more onerous types of signal and/or data connection reconstruction or reestablishment may be avoided by not changing certain application layer interface connection instances such as the NG interface, Xn interface, and F1 interface. This may be accomplished while dynamically transitioning from different dynamic allocation ports to maintain an end-to-end signal and/or data connection instance between the mobile BS portion and the fixed network portion FIG. 5 is a block diagram 500 of mobile BS portions 502A, 502B implemented as a full unit (FU) BS, in accordance with some embodiments. More specifically, the mobile BS portions 502A, 502B may be implemented as part of a low earth orbit satellites with full BS functionalities and which may operate in outer space along a specific orbit around the Earth. By being a FU BS, the mobile BS portions 502A, 502B may have full BS functionalities, in contrast with mobile base station portions that are a gNB-DU BS, as discussed above.

Each of the mobile BS portions 502A, 502B may interface with a transport conversion gateway 506 (Sat-GW) in the course of communicating with a core network 508 (e.g., a 5GC), which in turn may communicate with a data network (DN) 510. Also, each of the mobile BS portions 502A, 502B may be configured to communicate with a UE 512 over an air (e.g., NR-Uu, where NR represents new radio and Uu represents air or space) service link 514 and with the transport conversion gateway 506 over an air (e.g., NR-Uu) feeder link 516. Also, the link or interface between the transport conversion gateway 506 and the core network 508 may be an NG interface (e.g., an NG-C control interface or an NG-U data connection) and the link or interface between the core network 508 and the data network 510 may be an N6 interface. Both the transport conversion gateway 506 and the core network 508 may be implemented in a fixed (e.g., immovable) manner on the ground.

As noted above, it may be desirable to update the transport channel (e.g., feeder link 516) between the various mobile BS portions 502A, 502B in order to maintain end-to-end communications between the mobile BS portions 502A, 502B and the core network 508. For example, mobile BS portion 502B may be moving away from a first dynamic allocation port of the transport conversion gateway 506 and closer to a second dynamic allocation port of the transport conversion gateway 506. Accordingly, the mobile BS portion 502B may transition its TNL transport channel from the first dynamic allocation port to the second dynamic allocation port to maintain a robust feeder link 516 to the transport conversion gateway 506, maintain end-to-end communications with the core network 508, and avoid a RNL channel interruption.

Figure 6A:
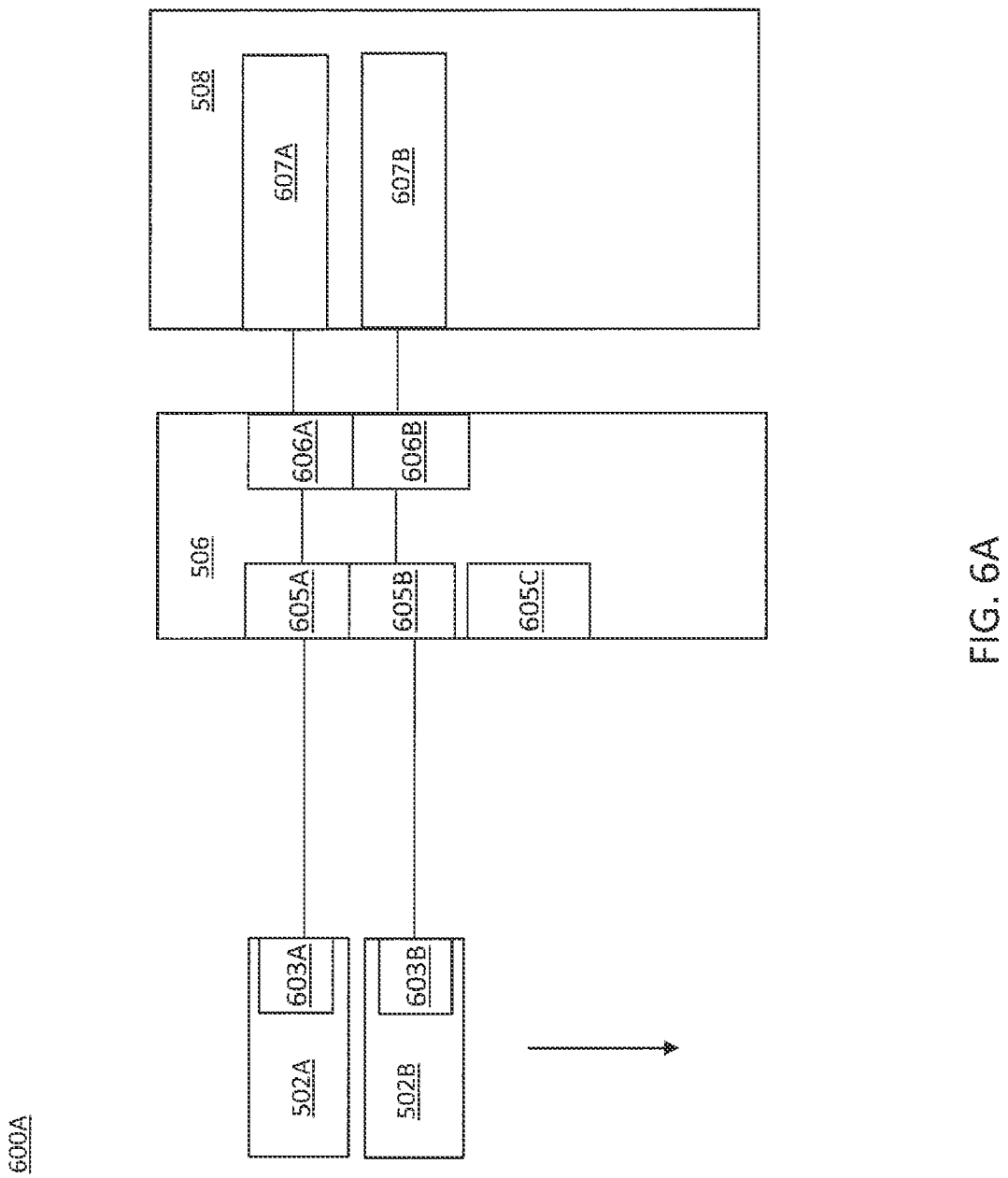
FIG. 6A is a block diagram that illustrates interactions between the mobile base station portions, the transport conversion gateway, and the core network of FIG. 5 at a first duration of time, in accordance with some embodiments.

FIG. 6A is a block diagram 600A that illustrates interactions between the mobile BS portions 502A, 502B, the transport conversion gateway 506, and the core network 508 at a first duration of time, in accordance with some embodiments. The transport conversion gateway 506 may serve as an intermediary between the mobile BS portions 502A, 502B, with respective mobile ports 603A, 603B, and the core network 508 (e.g., a fixed network portion) with fixed ports 407A, 407B. The transport conversion gateway 506 may include dynamic allocation ports 605A, 605B, 605C and static allocation ports 606A, 606B. Each of these ports may be identified with unique transport port information (e.g., one or more transport port addresses).

During the first duration of time, mobile port 603A of mobile BS portion 502A may be connected with dynamic allocation port 605A. Dynamic allocation port 605A may be connected with static allocation port 606A. Static allocation port 606A may be connected with fixed port 607A via an NG interface. Accordingly, the mobile BS portion 502A may achieve an end-to-end connection with the core network 508 via mobile port 603A, dynamic allocation port 605A, static allocation port 606A, and fixed port 607A. Similarly, mobile port 603B of mobile BS portion 502B may be connected with dynamic allocation port 605B. Dynamic allocation port 605B may be connected with static allocation port 606B. Static allocation port 606B may be connected with fixed port 607B via an NG interface. Accordingly, the mobile BS portion 502B may achieve an end-to-end connection with the core network 508 via mobile port 603B, dynamic allocation port 605B, static allocation port 606B, and fixed port 607B.

Figure 6B:
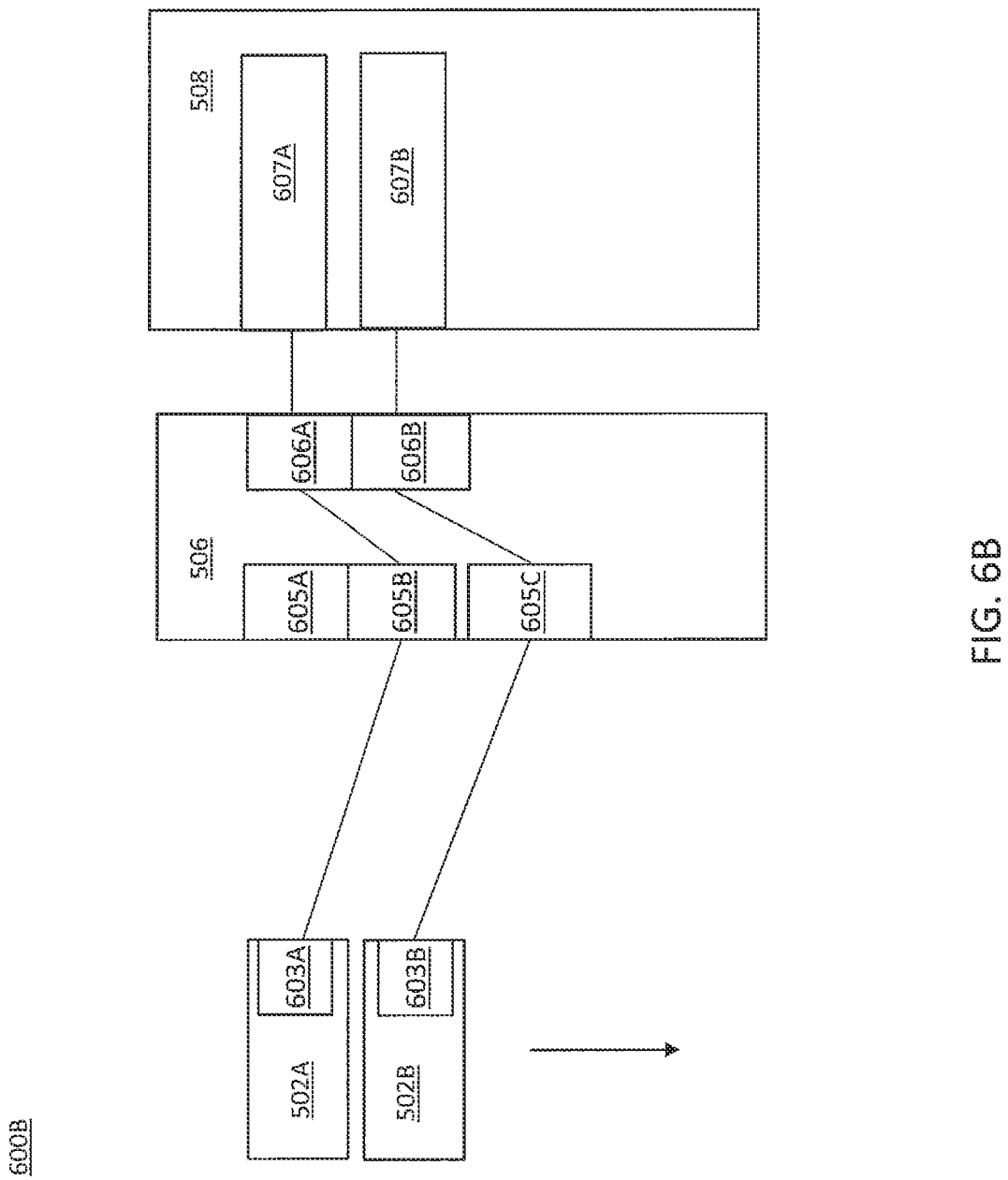
FIG. 6B is a block diagram that illustrates interactions between the mobile base station portions, the transport conversion gateway, and the core network FIG. 5 at a second duration of time after the first duration of time, in accordance with some embodiments.

FIG. 6B is a block diagram 600B that illustrates interactions between the mobile BS portions 502A, 502B, the transport conversion gateway 506, and the core network 508 at a second duration of time after the first duration of time, in accordance with some embodiments. During the second duration of time, mobile port 603A of mobile BS portion 502A may be connected with dynamic allocation port 605B. Dynamic allocation port 605B may be connected with static allocation port 606A. Static allocation port 606A may be connected with fixed port 607A via an NG interface. Accordingly, the mobile BS portion 502A may achieve an end-to-end connection with the core network 508 via mobile port 603A, dynamic allocation port 605B, static allocation port 606A, and fixed port 607A.

Similarly, mobile port 603B of mobile BS portion 502B may be connected with dynamic allocation port 605C. Dynamic allocation port 605C may be connected with static allocation port 606B. Static allocation port 606B may be connected with fixed port 607B via an NG interface. Accordingly, the mobile BS portion 502B may achieve an end-to-end connection with the core network 508 via mobile port 603B, dynamic allocation port 605C, static allocation port 606B, and fixed port 607B.

The second duration of time may represent a time when a first satellite, with which the mobile BS portion 502B travels, may travel further away from dynamic allocation port 605B and closer toward dynamic allocation port 605C. Also, the second duration of time may represent a time when a second satellite, on which the mobile BS portion 502A travels, may travel further away from dynamic allocation port 605A and closer toward dynamic allocation port 605B. In certain embodiments, the mobile BS portion 502A may assume a geographic location or position previously occupied by the mobile BS portion 502B. The movement of the first satellite and the second satellite may be determined via use of an ephemeris map. Also, the transition between the first duration of time and the second duration of time may be predetermined, such as by being predetermined in accordance with the ephemeris map.

In certain embodiments, the transition between the first duration of time and the second duration of time may represent when the connections between the mobile port 603A and static allocation port 606A transitions from utilizing dynamic allocation port 605A to utilizing dynamic allocation port 605A for a TNL transport channel. Also, the transition between the first duration of time and the second duration of time may represent when the connections between the mobile port 603B and static allocation port 606B transitions from utilizing dynamic allocation port 605B to utilizing dynamic allocation port 605C for a TNL transport channel. As noted above, each of these ports may be identified with unique transport port information (e.g., one or more transport port addresses) and thus the different dynamic allocation ports 605A, 605B, 605C may be uniquely identified via their respective transport port information.

In certain embodiments, as both satellites continue to operate with their respective mobile BS portions 502A, 502B, each mobile BS portion 502A, 502B may monitor the satellite's ephemeris map and satellite positioning information to determine when to transition between the different dynamic allocation ports of the transport conversion gateway 506. Accordingly, the NG interface between the static allocation port 606A and the fixed port 607A as well as the NG interface between the static allocation port 606B and the fixed port 607B may remain unchanged despite the movement of the satellites and the transitions between different dynamic allocation ports. Stated another way, the transport conversion gateway 506 may shield the application layer interface connection instances (e.g., NG interface) from any negative impact of mobile BS portion 502A, 502B mobility.

Figure 7:
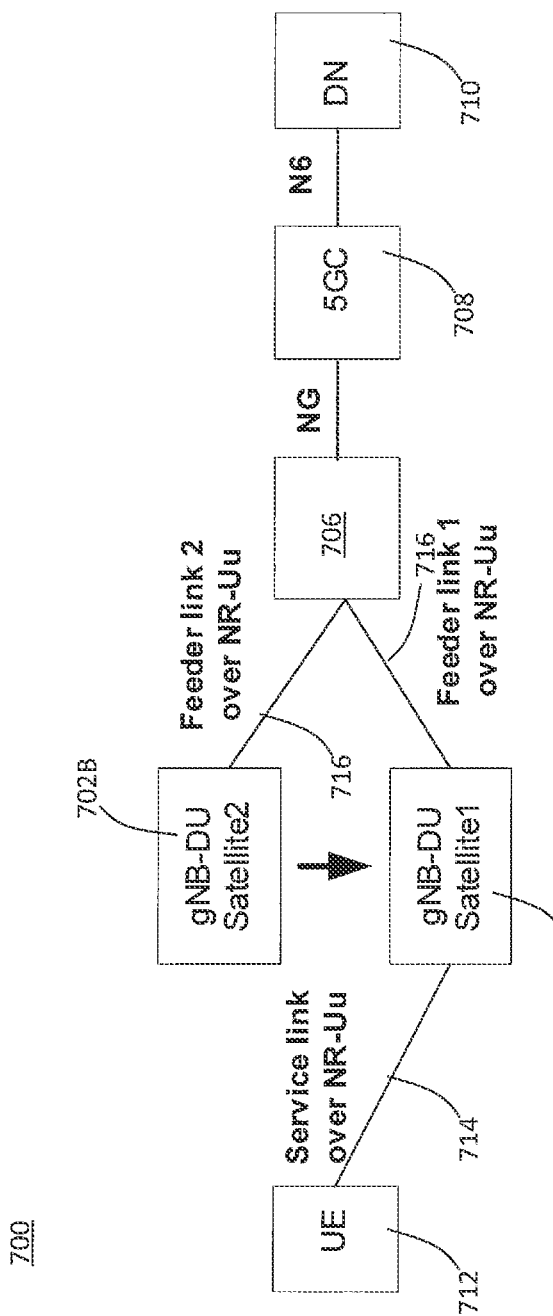
FIG. 7 is a block diagram of mobile base station portions implemented as a distributed unit (gNB-DU) base station, in accordance with some embodiments.

FIG. 7 is a block diagram 700 of mobile BS portions 702A, 702B implemented as a distributed unit (gNB-DU) BS, in accordance with some embodiments. More specifically, the mobile BS portions 702A, 702B may be implemented as part of a low earth orbit satellites with gNB-DU BS functionalities and which may operate in outer space along a specific orbit around the Earth. By being a gNB-DU BS, the mobile BS portions 702A, 702B may not have full BS functionalities, and may require interaction with the remaining BS functionalities in the centralized unit (gNB-CU) BS. The gNB-CU BS may be part of an integrated gNB-CU BS and transport conversion gateway 706.

Each of the mobile BS portions 702A, 702B may interface with a transport conversion gateway that is part of the integrated gNB-CU BS and transport conversion gateway 706. The integrated gNB-CU BS and transport conversion gateway 706 may communicate with a core network 708 (e.g., a 5GC), which in turn may communicate with a data network (DN) 710. Also, each of the mobile BS portions 702A, 702B may be configured to communicate with a UE 712 over an over air (e.g., NR-Uu) service link 714 and with integrated gNB-CU BS and transport conversion gateway 706 over an over air (e.g., NR-Uu) feeder link 716. As will be discussed further below, internal communications within the integrated gNB-CU BS and transport conversion gateway 706 may be at the F1 interface (e.g., an F1-C control interface or an F1-U data connection). Also, the link or interface between the integrated gNB-CU BS and transport conversion gateway 706 and the core network 708 may be an NG interface (e.g., an NG-C control interface or an NG-U data connection). Furthermore, the link or interface between the core network 708 and the data network 710 may be an N6 interface. Both the integrated gNB-CU BS and transport conversion gateway 706 and the core network 708 may be implemented in a fixed manner on the ground.

As noted above, it may be desirable to update the transport channel (e.g., feeder link 716) between the various mobile BS portions 702A, 702B in order to maintain end-to-end communications between the mobile BS portions 702A, 702B and the core network 708. For example, mobile BS portion 702B may be moving away from a first dynamic allocation port of the integrated gNB-CU BS and transport conversion gateway 706 and closer to a second dynamic allocation port of the integrated gNB-CU BS and transport conversion gateway 706. Accordingly, the mobile BS portion 702B may transition its TNL transport channel from the first dynamic allocation port to the second dynamic allocation port to maintain a robust feeder link 716 to the integrated gNB-CU BS and transport conversion gateway 706, maintain end-to-end communications with the core network 708, and avoid a RNL channel interruption.

Figure 8A:
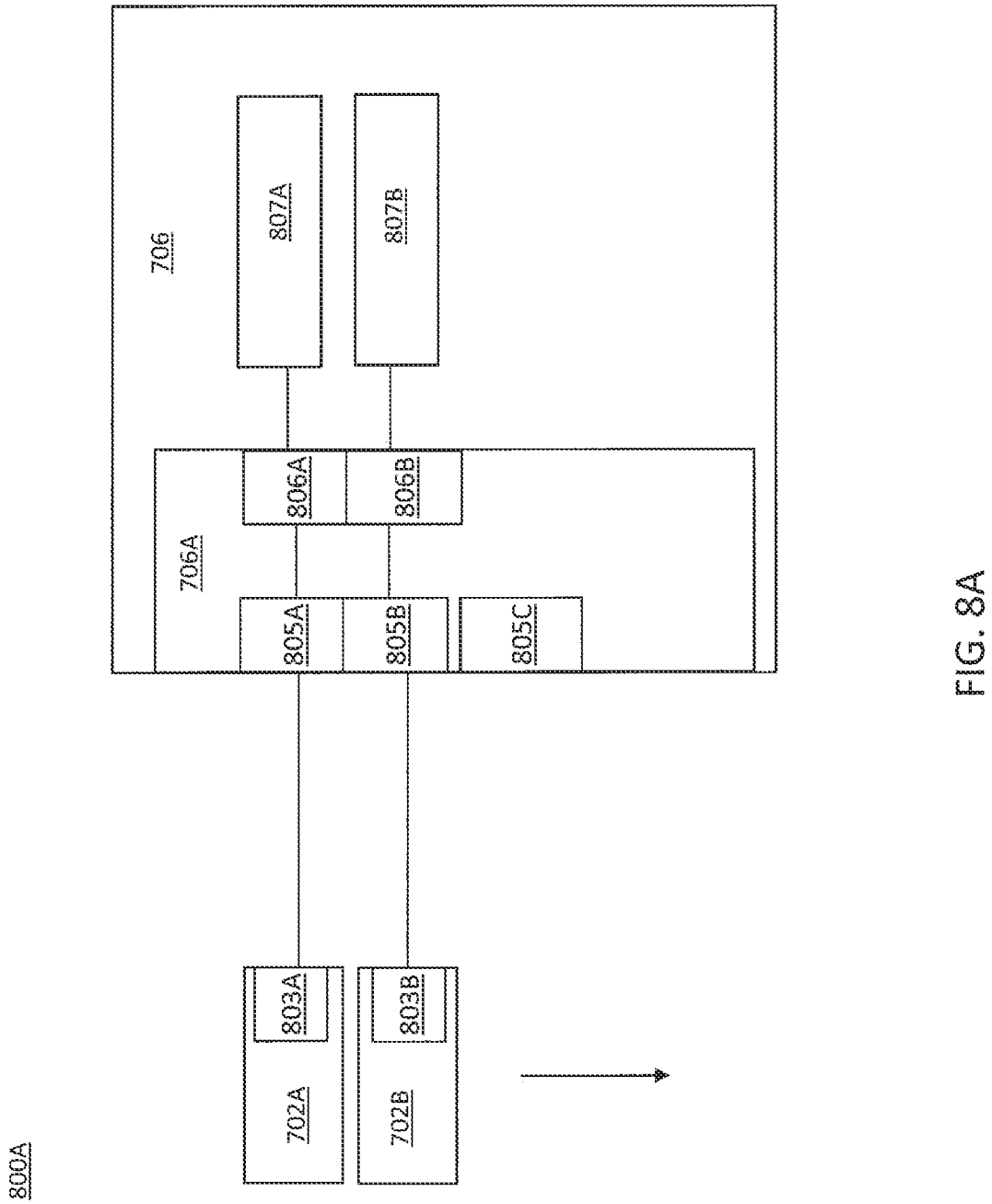
FIG. 8A is a block diagram that illustrates interactions between the mobile base station portions and the integrated centralized unit base station and transport conversion gateway of FIG. 7 at a first duration of time, in accordance with some embodiments.

FIG. 8A is a block diagram 800A that illustrates interactions between the mobile BS portions 702A, 702B, and the integrated gNB-CU BS and transport conversion gateway 706 at a first duration of time, in accordance with some embodiments. The integrated gNB-CU BS and transport conversion gateway 706 may include a transport conversion gateway 706A that may serve as an intermediary between the mobile BS portions 702A, 702B, with respective mobile ports 803A, 803B, and the integrated gNB-CU BS and transport conversion gateway 706 (e.g., a fixed network portion) with fixed ports 807A, 807B. More specifically, the fixed ports 807A, 807B may be part of a gNB-CU BS portion of the integrated gNB-CU BS and transport conversion gateway 706. The transport conversion gateway 706A may include dynamic allocation ports 805A, 805B, 805C and static allocation ports 806A, 806B. Each of these ports may be identified with unique transport port information (e.g., one or more transport port addresses).

During the first duration of time, mobile port 803A of mobile BS portion 702A may be connected with dynamic allocation port 805A. Dynamic allocation port 805A may be connected with static allocation port 806A. Static allocation port 806A may be connected with fixed port 807A via an F1 interface. Accordingly, the mobile BS portion 702A may achieve an end-to-end connection with the fixed port 807A via mobile port 803A, dynamic allocation port 805A, and static allocation port 806A. Similarly, mobile port 803B of mobile BS portion 702B may be connected with dynamic allocation port 805B. Dynamic allocation port 805B may be connected with static allocation port 806B. Static allocation port 806B may be connected with fixed port 807B via an F1 interface. Accordingly, the mobile BS portion 702B may achieve an end-to-end connection with the fixed port 807B via mobile port 803B, dynamic allocation port 805B, and static allocation port 806B.

Figure 8B:
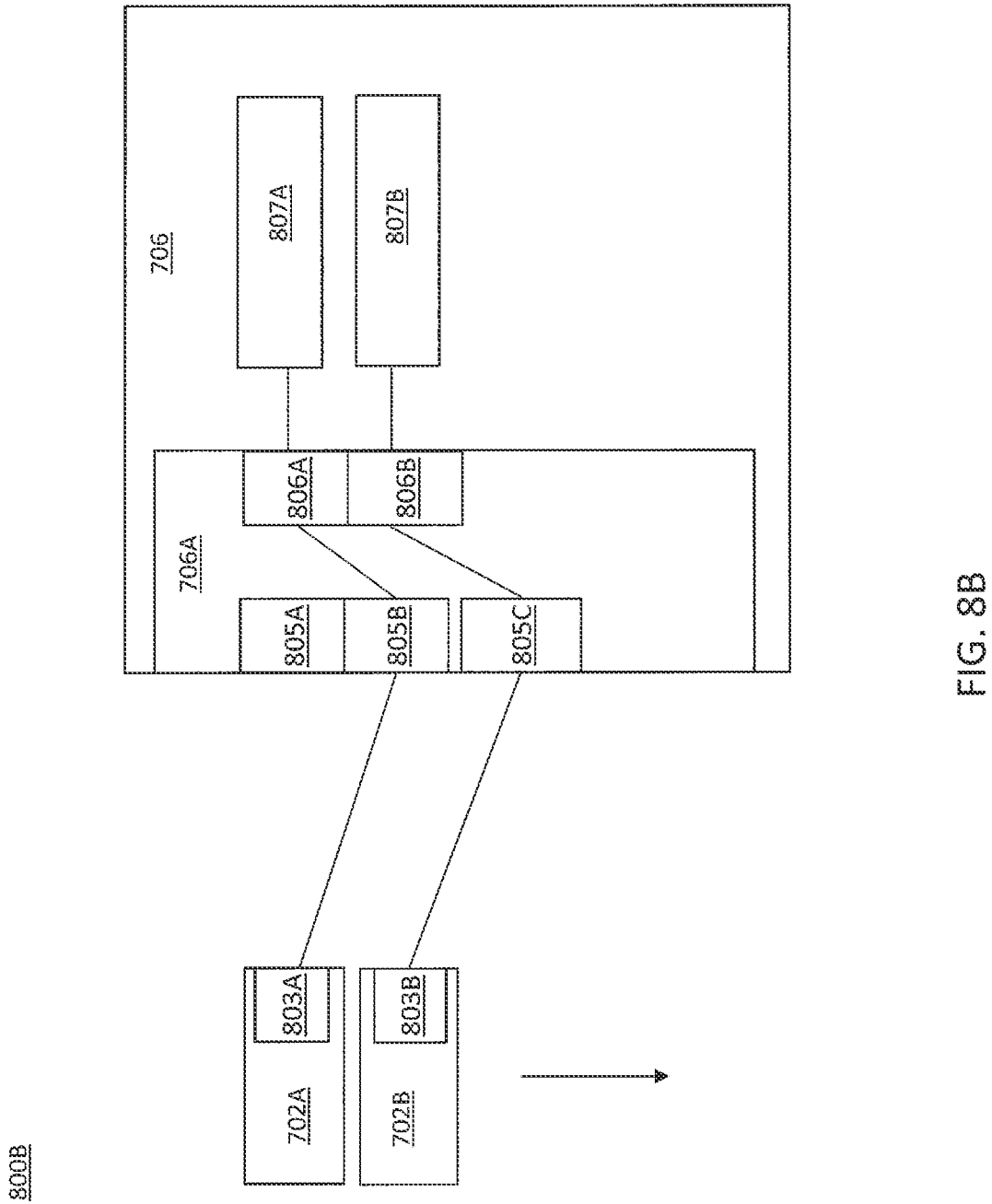
FIG. 8B is a block diagram that illustrates interactions between the mobile base station portions, the transport conversion gateway, and the integrated centralized unit base station and transport conversion gateway of FIG. 7 at a second duration of time after the first duration of time, in accordance with some embodiments.

FIG. 8B is a block diagram 800B that illustrates interactions between the mobile BS portions 702A, 702B, the transport conversion gateway 706A, and the integrated gNB-CU BS and transport conversion gateway 706 at a second duration of time after the first duration of time, in accordance with some embodiments. During the second duration of time, mobile port 803A of mobile BS portion 702A may be connected with dynamic allocation port 805B. Dynamic allocation port 805B may be connected with static allocation port 806A. Static allocation port 806A may be connected with fixed port 807A via an N1 interface. Accordingly, the mobile BS portion 702A may achieve an end-to-end connection with the fixed port 807A via mobile port 803A, dynamic allocation port 805B, and static allocation port 806A.

Similarly, mobile port 803B of mobile BS portion 702B may be connected with dynamic allocation port 805C. Dynamic allocation port 805C may be connected with static allocation port 806B. Static allocation port 806B may be connected with fixed port 807B via an F1 interface. Accordingly, the mobile BS portion 702B may achieve an end-to-end connection with the fixed port 807B via mobile port 803B, dynamic allocation port 805C, and static allocation port 806B.

The second duration of time may represent a time when a first satellite, with which the mobile BS portion 702B travels, may travel further away from dynamic allocation port 805B and closer toward dynamic allocation port 805C. Also, the second duration of time may represent a time when a second satellite, on which the mobile BS portion 702A travels, may travel further away from dynamic allocation port 805A and closer toward dynamic allocation port 805B. In certain embodiments, the mobile BS portion 702A may assume a geographic location or position previously occupied by the mobile BS portion 702B. The movement of the first satellite and the second satellite may be determined via use of an ephemeris map. Also, the transition between the first duration of time and the second duration of time may be predetermined, such as by being predetermined in accordance with the ephemeris map.

In certain embodiments, the transition between the first duration of time and the second duration of time may represent when the connections between the mobile port 803A and static allocation port 806A transitions from utilizing dynamic allocation port 805A to utilizing dynamic allocation port 805A for a TNL transport channel. Also, the transition between the first duration of time and the second duration of time may represent when the connections between the mobile port 803B and static allocation port 806B transitions from utilizing dynamic allocation port 805B to utilizing dynamic allocation port 805C for a TNL transport channel. As noted above, each of these ports may be identified with unique transport port information (e.g., one or more transport port addresses) and thus the different dynamic allocation ports 805A, 805B, 805C may be uniquely identified via their respective transport port information.

In certain embodiments, as both satellites continue to operate with their respective mobile BS portions 702A, 702B, each mobile BS portion 702A, 702B may monitor the satellite's ephemeris map and satellite positioning information to determine when to transition between the different dynamic allocation ports of the transport conversion gateway 706. Accordingly, the F1 interface between the static allocation port 806A and the fixed port 807A as well as the F1 interface between the static allocation port 806B and the fixed port 807B may remain unchanged despite the movement of the satellites and the transitions between use of different dynamic allocation ports. Stated another way, the transport conversion gateway 706A may shield the application layer interface connection instances (e.g., F1 interface) from any negative impact of mobile BS portion 702A, 702B mobility.

Figure 9:
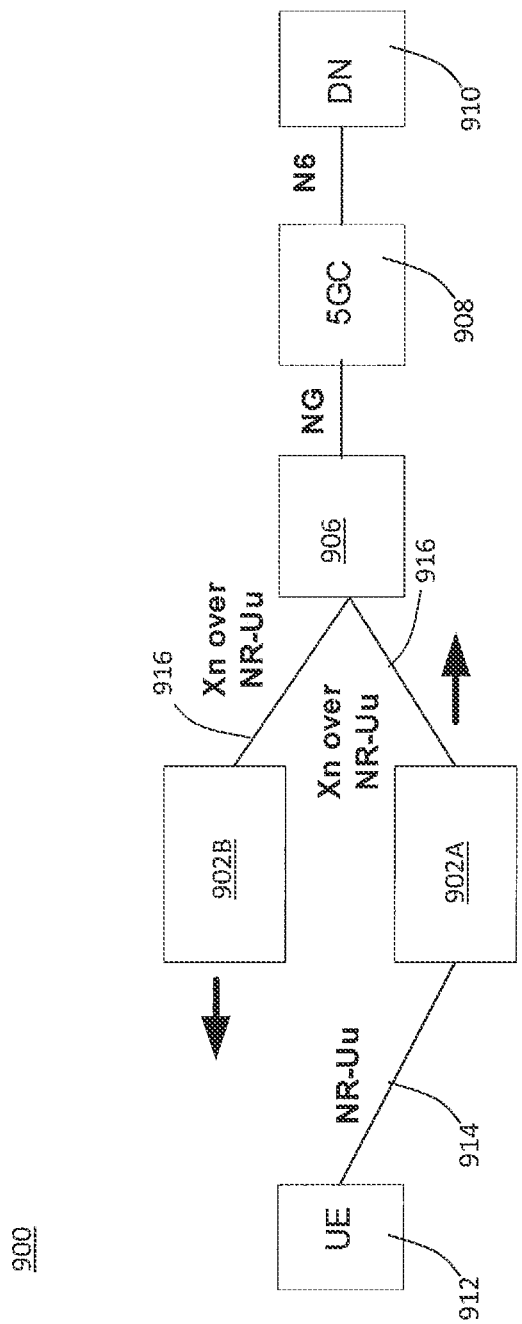
FIG. 9 is a block diagram of mobile base station portions implemented as a full unit (FU) base station on a drone, in accordance with some embodiments.

FIG. 9 is a block diagram 900 of mobile BS portions 902A, 902B implemented as a full unit (FU) BS, in accordance with some embodiments. More specifically, the mobile BS portions 902A, 902B may be implemented as part of on a drone or unmanned aerial vehicle that may fly within an established (e.g., predetermined) aerial course. By being a FU BS, the mobile BS portions 502A, 502B may have full BS functionalities, in contrast with mobile base station portions that are a gNB-DU BS, as discussed above.

Each of the mobile BS portions 902A, 902B may interface with a transport conversion gateway that is part of the integrated BS and transport conversion gateway 906 in the course of communicating with a core network 908 (e.g., a 5GC). The core network 908 may communicate with a data network (DN) 910. Also, each of the mobile BS portions 902A, 902B may be configured to communicate with a UE 912 over an over air (e.g., NR-Uu) service link 914 and with integrated gNB-CU BS and transport conversion gateway 906 over an over air (e.g., NR-Uu) feeder link 916. As will be discussed further below, each of the different BSes (e.g., mobile BS portions 902A, 902B and the integrated BS and transport conversion gateway 906) may communicate with each other over an Xn interface (e.g., an Xn-C control interface or an Xn-U data connection). Also, the link or interface between the integrated BS and transport conversion gateway 906 and the core network 908 may be an NG interface (e.g., an NG-C control interface or an NG-U data connection) and the link or interface between the core network 908 and the data network 910 may be an N6 interface. Both the integrated gNB-CU BS and transport conversion gateway 906 and the core network 908 may be implemented in a fixed manner on the ground.

As noted above, it may be desirable to update the transport channel (e.g., feeder link 916) between the various mobile BS portions 902A, 902B in order to maintain end-to-end communications between the mobile BS portions 902A, 902B and the core network 908. For example, mobile BS portion 902B may be moving away from a first dynamic allocation port of the integrated BS and transport conversion gateway 906 and closer to a second dynamic allocation port of the integrated BS and transport conversion gateway 906. Accordingly, the mobile BS portion 902B may transition its TNL transport channel from the first dynamic allocation port to the second dynamic allocation port to maintain a robust feeder link 916 to the transport conversion gateway 906, maintain end-to-end communications with the core network 908, and avoid a RNL channel interruption.

Figure 10A:
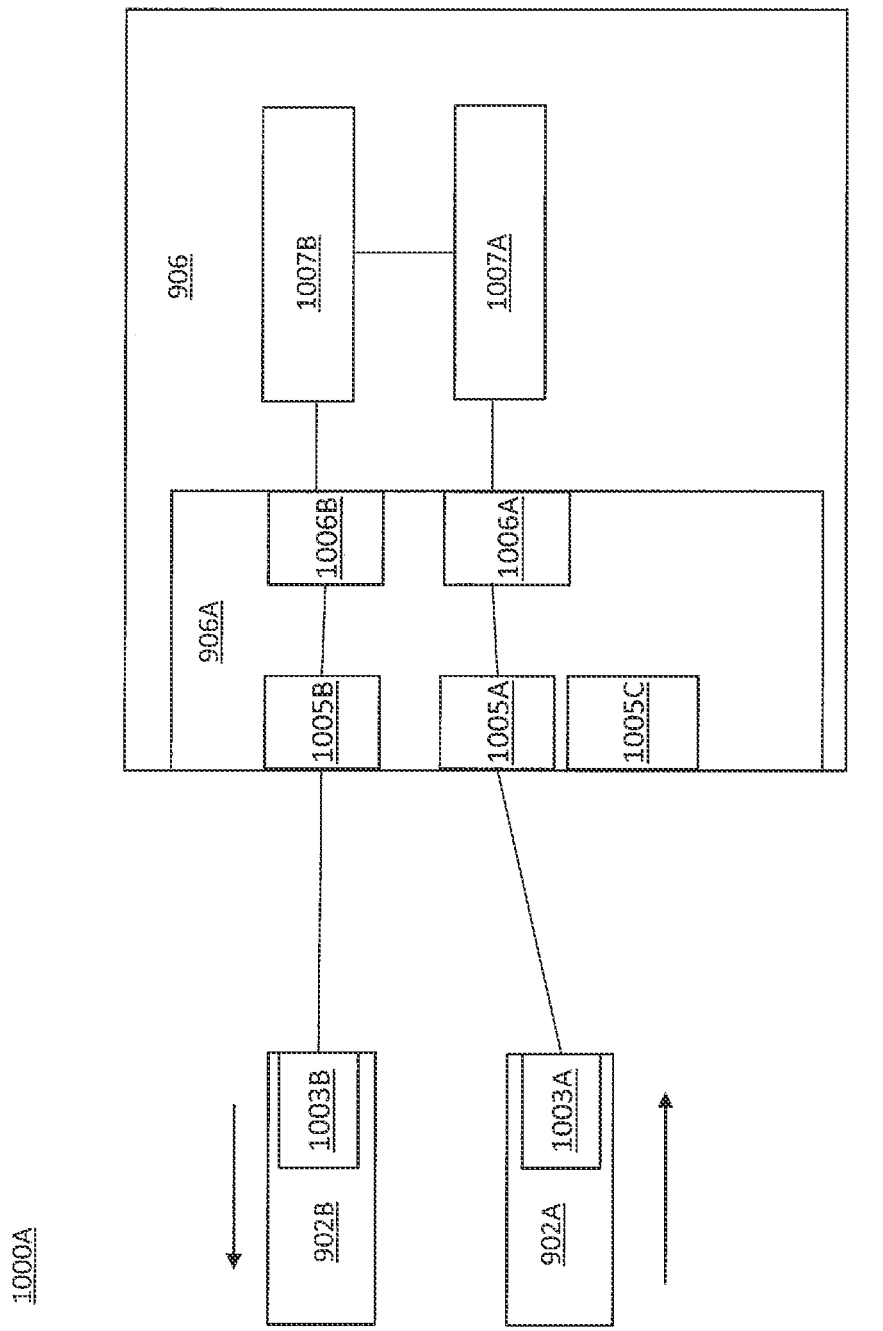
FIG. 10A is a block diagram that illustrates interactions between the mobile base station portions and the integrated base station and transport conversion gateway of FIG. 9 at a first duration of time, in accordance with some embodiments.

FIG. 10A is a block diagram 1000A that illustrates interactions between the mobile BS portions 902A, 902B, and the integrated BS and transport conversion gateway 906 at a first duration of time, in accordance with some embodiments. The integrated BS and transport conversion gateway 906 may include a transport conversion gateway 906A that may serve as an intermediary between the mobile BS portions 902A, 902B, with respective mobile ports 1003A, 1003B, and the integrated BS and transport conversion gateway 906 (e.g., a fixed network portion) with fixed ports 1007A, 1007B. More specifically, the fixed ports 1007A, 1007B may be part of a BS portion of the integrated BS and transport conversion gateway 906. The transport conversion gateway 906A may include dynamic allocation ports 1005A, 1005B, 1005C and static allocation ports 1006A, 1006B. Each of these ports may be identified with unique transport port information (e.g., one or more transport port addresses).

During the first duration of time, mobile port 1003A of mobile BS portion 1002A may be connected with dynamic allocation port 1005A. Dynamic allocation port 1005A may be connected with static allocation port 1006A. Static allocation port 1006A may be connected with fixed port 1007A via a Xn interface. Accordingly, the mobile BS portion 902A may achieve an end-to-end connection with the fixed port 1007A via mobile port 1003A, dynamic allocation port 1005A, and static allocation port 1006A. Similarly, mobile port 1003B of mobile BS portion 902B may be connected with dynamic allocation port 1005B. Dynamic allocation port 1005B may be connected with static allocation port 1006B. Static allocation port 1006B may be connected with fixed port 1007B via a Xn interface. Accordingly, the mobile BS portion 902B may achieve an end-to-end connection with the fixed port 1007B via mobile port 1003B, dynamic allocation port 1005B, and static allocation port 1006B. In certain embodiments, both of the fixed ports 1007A, 1007B may be connected to each other over an Xn interface as well.

Figure 10B:
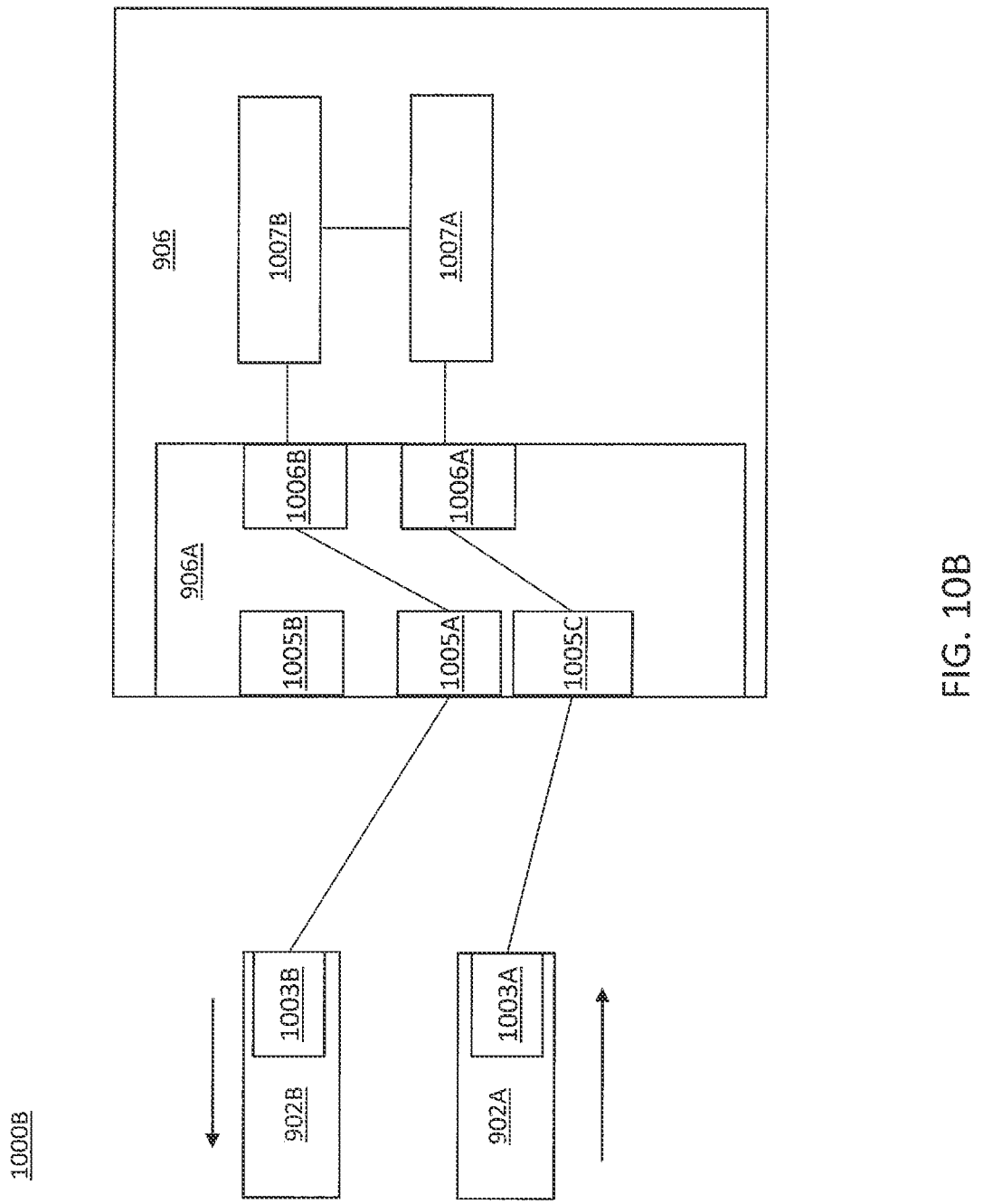
FIG. 10B is a block diagram that illustrates interactions between the mobile base station portions and the integrated base station and transport conversion gateway of FIG. 9 at a second duration of time, in accordance with some embodiments.

FIG. 10B is a block diagram 1000B that illustrates interactions between the mobile BS portions 902A, 902B, and the integrated BS and transport conversion gateway 906 at a second duration of time, in accordance with some embodiments. During the second duration of time, mobile port 1003A of mobile BS portion 902A may be connected with dynamic allocation port 1005C. Dynamic allocation port 1005C may be connected with static allocation port 1006A. Static allocation port 1006A may be connected with fixed port 1007A via an Xn interface. Accordingly, the mobile BS portion 902A may achieve an end-to-end connection with the fixed port 1007A via mobile port 1003A, dynamic allocation port 1005B, and static allocation port 1006A.

Similarly, mobile port 1003B of mobile BS portion 902B may be connected with dynamic allocation port 1005A. Dynamic allocation port 1005A may be connected with static allocation port 1006B. Static allocation port 1006B may be connected with fixed port 1007B via an Xn interface. Accordingly, the mobile BS portion 902B may achieve an end-to-end connection with the fixed port 1007B via mobile port 1003B, dynamic allocation port 1005A, and static allocation port 1006B.

The second duration of time may represent a time when a second drone, on which the mobile BS portion 902B travels, may travel further away from dynamic allocation port 1005B and closer toward dynamic allocation port 1005A. Also, the second duration of time may represent a time when a second drone, on which the mobile BS portion 902A travels, may travel further away from dynamic allocation port 1005A and closer toward dynamic allocation port 1005C. The movement of the first drone and the second drone may be predetermined (e.g., along a predetermined course over a predetermined amount of time) Also, the transition between the first duration of time and the second duration of time may be predetermined as well.

In certain embodiments, the transition between the first duration of time and the second duration of time may represent when the connections between the mobile port 1003A and static allocation port 1006A transitions from utilizing dynamic allocation port 1005A to utilizing dynamic allocation port 1005C for a TNL transport channel. Also, the transition between the first duration of time and the second duration of time may represent when the connections between the mobile port 1003B and static allocation port 1006B transitions from utilizing dynamic allocation port 1005B to utilizing dynamic allocation port 1005A for a TNL transport channel. As noted above, each of these ports may be identified with unique transport port information (e.g., one or more transport port addresses) and thus the different dynamic allocation ports 1005A, 1005B, 1005C may be uniquely identified via their respective transport port information.

In certain embodiments, as both drones continue to operate with their respective mobile BS portions 902A, 902B, each mobile BS portion 902A, 902B may monitor their respective drone's predetermined course and positioning information to determine when to transition between the different dynamic allocation ports of the transport conversion gateway 906A. Accordingly, the Xn interface between the static allocation port 1006A and the fixed port 1007A as well as the Xn interface between the static allocation port 1006B and the fixed port 1007B may remain unchanged despite the movement of the drones and the transitions different dynamic allocation ports. Stated another way, the transport conversion gateway 906A may shield the application layer interface connection instances (e.g., Xn interface) from certain negative impacts of mobile BS portion 902A, 902B mobility.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a gateway of a communication node, comprising:
   receiving a first signal from a distributed unit of a base station at a first dynamic port of the gateway during a first duration of time, wherein the distributed unit of the base station is located within a satellite or an unmanned aerial vehicle (UAV);
   directing the first signal from the first dynamic port to a static port of the gateway based on transport network layer information during the first duration of time, wherein the static port is connected to a fixed port of a fixed network portion;
   receiving a second signal from the distributed unit of the base station at a second dynamic port of the gateway during a second duration of time after the first duration of time; and
   directing the second signal from the second dynamic port to the static port during the second duration of time based on the transport network layer information, wherein the distributed unit of the base station and the fixed network portion maintain radio network layer application protocol connection instances while the distributed unit of the base station is in motion, wherein the radio network layer application protocol connection instances include one or both of: a next generation application protocol interface (NGAP) and an F1 application protocol interface (F1AP),
   wherein the first dynamic port, the second dynamic port, and the static port are within the gateway of the communication node.

2. The method of claim 1, wherein the distributed unit of the base station is in motion relative to the gateway and the static port.

3. The method of claim 1, wherein the distributed unit of the base station, while in motion, is configured to communicate with different dynamic ports over time.

4. The method of claim 1, wherein the radio network layer application protocol connection instances further comprise an Xn application protocol interface (XnAP).

5. The method of claim 1, further comprising receiving the transport network layer information from an immobile core network or a fixed network portion.

6. The method of claim 1, wherein the transport network layer information is part of communication node system information associated with the communication node that comprises the gateway.

7. The method of claim 1, wherein an interface between the distributed unit of the base station and the first dynamic port is within a transport network layer that provides transport services to an upper radio network layer.

8. The method of claim 7, wherein the transport services include: transporting application protocol signaling or user data.

9. The method of claim 1, wherein an interface between the first dynamic port and the static port is within a transport network layer of the gateway.

10. The method of claim 1, further comprising relaying the first signal and the second signal between the gateway and either a fixed port of a core network or a fixed network portion.

11. The method of claim 1, wherein an interface between the static port and the distributed unit of the base station is within a transport network layer across the gateway.

12. The method of claim 1, wherein each of the first signal and the second signal comprises radio network layer application protocol signaling or user data.

13. A gateway of a communication node, comprising:
   a transceiver configured to:
      receive a first signal from a distributed unit of a base station at a first dynamic port of the gateway during a first duration of time, wherein the distributed unit of the base station is located within a satellite or an unmanned aerial vehicle (UAV), and
      receive a second signal from the distributed unit of the base station at a second dynamic port of the gateway during a second duration of time after the first duration of time;
   at least one processor configured to:
      direct the first signal from the first dynamic port to a static port of the gateway based on transport network layer information during the first duration of time, wherein the static port is connected to a fixed port of a fixed network portion, and
      direct the second signal from the second dynamic port to the static port during the second duration of time based on the transport network layer information, wherein the distributed unit of the base station and the fixed network portion maintain radio network layer application protocol connection instances while the distributed unit of the base station is in motion, wherein the radio network layer application protocol connection instances include one or both of: a next generation application protocol interface (NGAP) and an F1 application protocol interface (F1AP), wherein the first dynamic port, the second dynamic port, and the static port are within the gateway of the communication node.

14. The gateway of claim 13, wherein the transport network layer information is part of communication node system information associated with the communication node that comprises the gateway.

15. The gateway of claim 13, wherein an interface between the distributed unit of the base station and the first dynamic port is within a transport network layer that provides transport services to an upper radio network layer.

16. The gateway of claim 15, wherein the transport services include: transporting application protocol signaling or user data.

17. The gateway of claim 13, wherein an interface between the first dynamic port and the static port is within a transport network layer of the gateway.

18. The gateway of claim 13, further comprising relaying the first signal and the second signal between the gateway and either a fixed port of a core network or a fixed network portion.

* * * * *